(12) United States Patent
Zhang et al.

(10) Patent No.: US 7,817,547 B2
(45) Date of Patent: *Oct. 19, 2010

(54) UNCOVERING THE DIFFERENCES IN BACKBONE NETWORKS

(75) Inventors: Ming Zhang, Redmond, WA (US); Ratul Mahajan, Seattle, WA (US)

(73) Assignee: Microsoft Corporation, Redmond, WA (US)

(*) Notice: Subject to any disclaimer, the term of this patent is extended or adjusted under 35 U.S.C. 154(b) by 439 days.

This patent is subject to a terminal disclaimer.

(21) Appl. No.: 11/865,988

(22) Filed: Oct. 2, 2007

(65) Prior Publication Data
US 2009/0086741 A1    Apr. 2, 2009

(51) Int. Cl.
G06F 11/00 (2006.01)
G06F 15/173 (2006.01)
H04L 12/26 (2006.01)

(52) U.S. Cl. .............. 370/231; 370/236.2; 370/252; 370/449; 709/224

(58) Field of Classification Search .......... 370/229–235, 370/238, 252, 332, 449, 477; 709/223–224, 709/241
See application file for complete search history.

(56) References Cited

U.S. PATENT DOCUMENTS

| | | | |
|---|---|---|---|
| 6,363,056 B1 * | 3/2002 | Beigi et al. ............... | 370/252 |
| 6,748,416 B2 * | 6/2004 | Carpenter et al. .......... | 709/202 |
| 7,222,190 B2 * | 5/2007 | Klinker et al. ............. | 709/238 |
| 2002/0055999 A1 | 5/2002 | Takeda | |
| 2002/0099816 A1 * | 7/2002 | Quarterman et al. ........ | 709/224 |
| 2003/0018769 A1 * | 1/2003 | Foulger et al. ............. | 709/223 |
| 2004/0064293 A1 * | 4/2004 | Hamilton et al. ........... | 702/182 |
| 2004/0264481 A1 | 12/2004 | Darling et al. | |
| 2005/0108071 A1 | 5/2005 | Jain et al. | |
| 2005/0154768 A1 | 7/2005 | Theimer et al. | |
| 2006/0182034 A1 | 8/2006 | Klinker et al. | |
| 2006/0233106 A1 | 10/2006 | Achlioptas et al. | |
| 2007/0011685 A1 | 1/2007 | Yim et al. | |
| 2007/0294754 A1 | 12/2007 | Finkelstein et al. | |
| 2008/0002576 A1 * | 1/2008 | Bugenhagen et al. ....... | 370/229 |
| 2008/0049621 A1 | 2/2008 | McGuire et al. | |
| 2008/0209273 A1 | 8/2008 | Bahl et al. | |
| 2008/0320003 A1 | 12/2008 | Heinson et al. | |
| 2009/0086640 A1 * | 4/2009 | Zhang et al. ............... | 370/241 |
| 2009/0086741 A1 | 4/2009 | Zhang et al. | |
| 2009/0089438 A1 | 4/2009 | Agarwal et al. | |
| 2009/0190583 A1 * | 7/2009 | Accetta et al. ............. | 370/389 |
| 2009/0222553 A1 | 9/2009 | Qian et al. | |

OTHER PUBLICATIONS

Spring et al., "Measuring ISP Topologies with Rocketfuel", Aug. 2002, SIGCOMM'02, ACM 1-58113-570, pp. 1-13.*

(Continued)

*Primary Examiner*—Tri H Phan
(74) *Attorney, Agent, or Firm*—Lee & Hayes, PLLC

(57) ABSTRACT

The claimed subject matter provides systems and/or methods that uncovers detailed differences in the performance of different Internet Service Provider ISP) networks. The system can include components, devices, and/or processes that utilize a list of target Internet Service Provider (ISP) networks to create a list of Internet Protocol (IP) addresses to interrogate, distribute the list of addresses to measurement nodes and obtains in return probing results from the measurement nodes, the probing results employed thereafter to provide comparative performance metrics associated with the target Internet Service Provider (ISP) networks.

19 Claims, 11 Drawing Sheets

OTHER PUBLICATIONS

U.S. Appl. No. 09/714,406, filed Nov. 16, 2000, to Bahl et al., titled "System Method for Performing Client-Centric Load Balancing of Multiple Globally-Dispersed Servers".

U.S. Appl. No. 12/189,438, filed Aug. 11, 2008, to Ahmad et al., titled "Distributed Load Balancer".

Mahjan, et al. "Uncovering Performance Differences among Backbone ISPs with Netfifff" (2008) USENIX Association, USDI '08: 5th Symposium on Networked Systems Design & Implementation, 14 pages.

OA from MS1-4617US, dated Jun. 1, 2010, 33 pages.

* cited by examiner

UNCOVERING THE DIFFERENCES IN BACKBONE NETWORKS

CROSS REFERENCE TO RELATED APPLICATIONS

This application is related to co-pending U.S. patent application Ser. No. 11/865,914, filed Oct. 2, 2007, entitled, "UNCOVERING THE DIFFERENCES IN BACKBONE NETWORKS".

BACKGROUND

Performance of distributed applications can depend heavily on the behavior of underlying networks. Nevertheless, the problem of understanding how well various Internet Service Provider (ISP) networks deliver traffic has received scant attention. To date, customers of these networks have typically been in the dark about which Internet Service Providers (ISPs) are better than others, or if a higher price necessarily provides indication of better performance. A common method for customers to obtain this information has been by asking each other about their respective experiences with certain providers. Similarly, distributed applications are equally unaware of how their performance can be impacted by their choice of Internet Service Provider (ISP) (e.g., when available, for instance, with DNS redirectors or overlays), unless it is actively measured.

In addition to enabling better distributed applications and helping customers, shedding light on the relative performance of Internet Service Providers (ISPs) can also improve network infrastructure as a whole. The overall performance of the Internet depends collectively on multiple Internet Service Providers (ISPs), and the inability to differentiate between individual Internet Service Providers (ISPs) discourages innovation and does not provide strong incentives to resolve problems. To address this, some researchers have proposed radically different (and arguably heavy-weight mechanisms) based on Internet Service Provider (ISP) accountability and overlay or customer directed routing. Other researchers in contrast have posited that by merely providing visibility into the relative performance of Internet Service Providers (ISPs) provides the right incentives for Internet Service Providers to adopt actions to correct deficiencies in their networks. For instance, no Internet Service Provider (ISP) is necessarily motivated to improve its network where it is merely proclaimed that the average latency in the Internet is 60 ms. However, if it is announced that the average latency for customers of one Internet Service Provider (ISP) is 20 ms whereas the average latency of another Internet Service Provider (ISP) is 200 ms, market forces will likely motivate the second Internet Service Provider (ISP) to correct whatever is inducing this comparative disadvantage.

The relative performance of Internet Service Providers (ISPs) can depend on several factors, including the distance between the source and the destination, the geographic properties of traffic, and even time of day. Further, the performance of paths internal to an Internet Service Provider (ISP), which can form the basis of typical Service Level Agreements (SLAs) and the commercial effort, may not directly reflect end-to-end performance. Thus, the choice of an Internet Service Provider (ISP) can be a complex decision requiring a detailed analysis of Internet Service Provider (ISP) performance.

Based on measurements of their own network, many Internet Service Providers (ISPs) offer a Service Level Agreement (SLA) that specifies the performance that customers can expect. But perhaps because of their unwillingness to vouch for performance outside their network, these Service Level Agreements (SLAs) are typically not end-to-end and mention performance only within the Internet Service Provider's (ISP's) network. For instance, a Service Level Agreement (SLA) may promise that 95% of traffic will not experience a latency of more than 100 ms inside the Internet Service Provider's (ISP's) network. A few providers also offer "off-net" Service Level Agreements (SLAs) in which performance is specified across two networks—the Internet Service Provider's (ISP's) own network and that of some of its neighbors.

For comparing Internet Service Providers (ISPs), current Service Level Agreements (SLAs) have two shortcomings. First, application performance depends on the entire path to the destination and not only on a subpath. As such, Internet Service Providers (ISPs) with better Service Level Agreements (SLAs) may not offer better performance. Second, because they are independently offered by different Internet Service Providers (ISPs), Service Level Agreements (SLAs) make comparisons among Internet Service Providers (ISPs) difficult. Some Service Level Agreements (SLA) may mention latency, some may mention loss rates, some may mention available capacity, and yet others may mention a combination. Even with comparable measures, difficulties in comparison can stem from the differences in the size and the spread of different Internet Service Providers (ISPs). For instance, is a 100 ms performance bound for an Internet Service Provider (ISP) with an international network necessarily better or worse than a 50 ms bound for an Internet Service Provider (ISP) with only a nationwide network?

Many listings compare broadband and dial-up Internet Service Providers (ISPs) based primarily on their prices and maximum theoretical capacity. For example, one system measures latency and loss rate for paths internal to Internet Service Providers (ISPs) and for paths between pairs of Internet Service Providers (ISPs). This is generally done by co-locating nodes within some Internet Service Providers' (ISPs') Points of Presence (PoPs) and measuring the paths between them. Such an approach however can have several limitations. First, because the approach requires active cooperation from Internet Service Providers (ISPs) to place nodes inside their Points of Presence (PoPs), coverage of an Internet Service Provider's (ISP's) network can be poor. Second, the technique does not typically measure the entire path to the destination but only a part of it. Third, the method probes use of the IP addresses of its measurement nodes as the destination address. Because Internet routing is destination-based, the performance experienced by destination bound traffic may differ from measurement-node-bound traffic.

SUMMARY

The following presents a simplified summary in order to provide a basic understanding of some aspects of the disclosed subject matter. This summary is not an extensive overview, and it is not intended to identify key/critical elements or to delineate the scope thereof. Its sole purpose is to present some concepts in a simplified form as a prelude to the more detailed description that is presented later.

The claimed subject matter uncovers or reveals detailed differences in the performance of Internet Service Provider (ISP) networks. For example, it details such information as: whether some Internet Service Provider (ISP) networks are better than others; and whether the relative performances of Internet Service Provider (ISP) networks are dependent on workload. While the subject matter as claimed can be trivial to deploy, as it utilizes a modest number of nodes that can be placed in edge networks (e.g., a wide variety of access devices that can provide entry points into and out of enterprise or service provider core networks), it nevertheless can measure Internet Service Provider (ISP) performance in a way that can be relevant to customers and applications, and further provides a fair, unbiased comparison among Internet Service Providers. In order to accomplish its aims, the claimed subject matter, for instance, can aggressively reduce probing overhead and ensure that the analysis is robust to the inherent noise in measurements.

The results provided through utilization of the claimed subject matter can include aiding applications and customers to understand the performance they can expect when they use Internet Service Provides (ISPs) in general, and more particularly, can provide for objective comparisons between specific Internet Service Providers (ISPs). Typically, the essential properties associated with results generated though use of the claimed subject matter can include, for example, measurements related to performance of paths that extend to destination networks, rather than stopping where they exit the extent of a particular Internet Service Provider's network. Measuring the performance of paths within the Internet Service Provider's network is a common feature in current Service Level Agreements (SLAs) that Internet Service Providers generally offer their customers. However, such Service Level Agreements (SLAs) have dubious utility where distributed application performance depends on the end-to-end performance of the entire path where multiple Internet Service Providers (ISPs) can be used. Additional properties that can be associated with results generated through utilization of the claimed subject matter can also include guidance on how the claimed subject matter measures path performance and measurement timescales, thus enabling a fair comparison among Internet Service Providers (ISPs), by taking into account the inherent differences in their size and geographic spread. Moreover, results generated through utilization of the claimed subject matter can also aid Internet Service Providers (ISPs) improve performance for customers and their applications.

It should be noted, that in order to ease deployment, the claimed subject matter, without limitation, can be composed of a modest number of measurement nodes that can be placed or situated inside edge networks (e.g., on routers, switches, routing switches, integrated access devices, multiplexers, and a variety of Metropolitan Area Network (MAN) and Wide Area Network (WAN) access devices that can provide entry points into enterprise or service provider core networks) and does not require active cooperation from Internet Service Providers (ISPs) themselves.

In accordance with an illustrative aspect, the claimed subject matter provides a machine implemented system that uncovers detailed differences in performance of Internet Service Provider (ISP) networks. The system can include controllers that utilize lists of target networks to create a list of destinations to interrogate; the controllers propagate the list of destinations to measurement nodes and obtain in return probing results, the probing results after analysis can be employed to provide comparative performances of the target networks.

To the accomplishment of the foregoing and related ends, certain illustrative aspects of the disclosed and claimed subject matter are described herein in connection with the following description and the annexed drawings. These aspects are indicative, however, of but a few of the various ways in which the principles disclosed herein can be employed and is intended to include all such aspects and their equivalents. Other advantages and novel features will become apparent from the following detailed description when considered in conjunction with the drawings.

DETAILED DESCRIPTION

Figure 1:
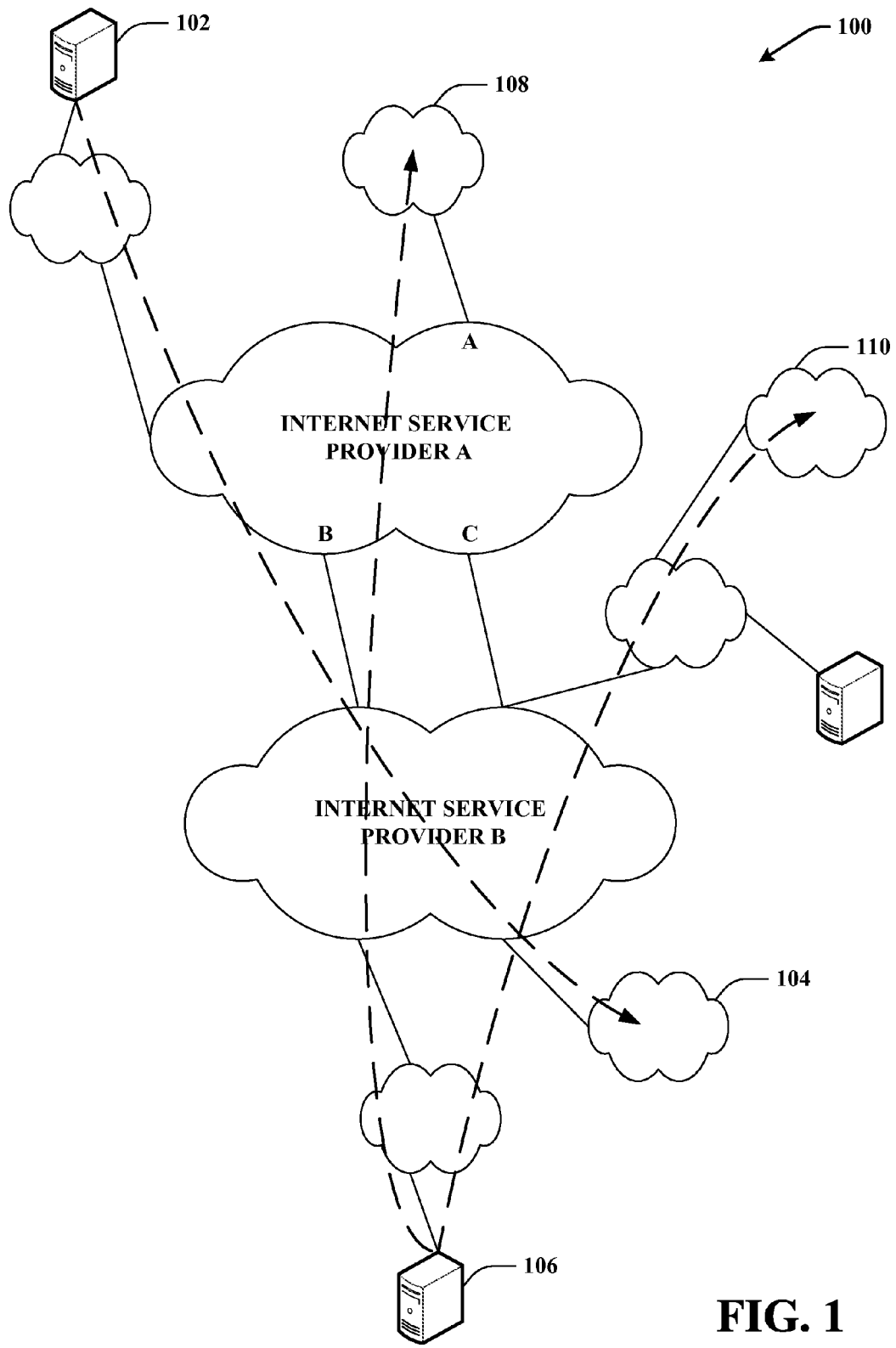
FIG. 1 illustrates a machine implemented system that uncovers detailed differences in the performance of Internet Service Provider (ISP) networks in accordance with the claimed subject matter.

The subject matter as claimed is now described with reference to the drawings, wherein like reference numerals are used to refer to like elements throughout. In the following description, for purposes of explanation, numerous specific details are set forth in order to provide a thorough understanding thereof. It may be evident, however, that the claimed subject matter can be practiced without these specific details. In other instances, well-known structures and devices are shown in block diagram form in order to facilitate a description thereof.

The subject matter as claimed in accordance with one aspect provides systems and methods that quantify how well traffic handed to an Internet Service Provider (ISP) is delivered to a destination network. This can include traffic that is handed by the Internet Service Provider's (ISP's) customers for various destinations and traffic handed by the Internet Service Provider's (ISP's) neighbors for its customers. Further, the claimed subject matter can enable a direct comparison across Internet Service Providers (ISPs) such that customers and applications can tell which Internet Service Provider (ISP) is better suited for their workload.

While there can be several ways to quantify the performance of traffic, measurement of performance generally can be application dependent. Accordingly, latency (e.g., the time it takes packets to reach their destination after they are handed to an Internet Service Provider (ISP)) can form a basic measure of interest to most applications.

There are three properties that the claimed subject matter possesses. First and foremost, the results generated by the claimed subject matter are directly relevant to consumers (e.g., applications and Internet Service Providers' (ISPs') customers). Such a property can have four important implications for the claimed subject matter. (i) The subject matter as claimed can measure the performance of the entire path from where traffic enters the Internet Service Provider (ISP) to where it reaches the destination network and not just the internal component within the Internet Service Provider (ISP) network itself. While some may argue that the external component should be discounted because the Internet Service Provider (ISP) does not control this external segment, the claimed subject matter employs the entire path since it is the entire end-to-end path that generally matters most to applications/customers and because the Internet Service Provider (ISP) can control such aspects through routing and/or peering decisions. (ii) Results produced by the claimed subject matter typically reflect the experience of application traffic. This means that traffic addressed to destination networks of interest can be employed; not merely measurements of underlying links. While measurement of underlying links can be easier to obtain and/or utilize, these measurements generally do not reflect application experience because of routing issues. Also, by reflecting the experience of application traffic instead of propagating spurious generated traffic per se, the claimed subject matter can, for example, measure performance of authentic application traffic, rather than generated pseudo traffic, in a passive manner. (iii) Along with a long-term, average view, the claimed subject matter can capture performance over short intervals. While the average performance of an Internet Service Provider (ISP) is of interest, short-term views provide their own utility: they are what wide area applications need for short-term adjustments, they inform customers of the variance in an Internet Service Provider's (ISP's) performance, and they provide information on how and Internet Service Provider (ISP) performs during times that are more important to the customer (e.g., day versus night). Based at least in part on the timescales of routing dynamics in the Internet, the claimed subject matter can utilize a period of 15 minutes for capturing a snapshot of the Internet Service Provider's (ISP's) performance. (iv) The claimed subject matter is able to customize the results generated based on a consumer needs, because a single number or ranking is generally unlikely to be suitable to all customers. For instance, a content provider may care more about how an Internet Service Provider (ISP) carries traffic from a city to the rest of the world, an overlay network for voice may care more about low latency average and variance, and a small Internet Service Provider (ISP) with home users may care more about the performance to popular Web services.

The second of the three properties that the claimed subject matter possesses is that the measures of Internet Service Provider (ISP) behavior appropriately accounts for inherent differences in Internet Service Provider (ISP) networks, such as their size and geographic presence. For instance, it is unfair to simply report the average time traffic takes to reach a destination after entering Internet Service Provider (ISP) networks. This is because there are more destination networks in North America, and pass the measure above is biased towards Internet Service Providers (ISPs) with a major presence there. Similarly, if one Internet Service Provider (ISP) has international presence and another has a smaller network, directly comparing the average time traffic spends in their networks is unfair.

To account for differences among Internet Service Providers (ISPs), instead of viewing them as networks composed of routers and links, the claimed subject matter can perceive them as networks that connect cities by inferring the cities of their routers. Along with inferences about the geographical location of destination networks, it enables the claimed subject matter to normalize results based on geography. Applications can then compose metrics to determine what combination of Internet Service Providers (ISPs) and paths would best serve their needs.

The third property manifested by the subject matter as claimed relates to the fact that the results generated can not only help customers but also aid Internet Service Providers (ISPs) better understand their networks. In particular, results generated by the claimed subject matter should enable Internet Service Providers (ISPs) understand, for instance, whether performance issues that customers experience stem from their own network or from outside the network and whether performance is particularly bad from certain cities. As will be readily appreciated by those of ordinary skill in the art, resolutions can be different for each case.

Building a system to compare Internet Service Providers (ISPs) that can be embedded in an inter-network of many other Internet Service Providers (ISPs) can present an interesting challenge. Unlike file and database systems, the claimed subject matter cannot merely bring a copy of an Internet Service Provider (ISP) network into a laboratory and construct an evaluation system around it. Instead the Internet Service Provider (ISP) network typically must be measured in situ. In an ideal system measurement nodes can be situated inside each Point of Presence (PoP) and each destination network in order to measure how traffic is delivered from Points of Presence (PoPs) (e.g., where Internet Service Providers (ISPs) are handed traffic) to destination networks. In such an ideal system the measurement task is typically straightforward and trivial. Nevertheless, such a system generally has a very high deployment barrier: (i) it can require thousands of measurement nodes to measure paths to even a fraction of destination networks; (ii) it can require significant cooperation for Internet Service Providers (ISPs) to place nodes inside each of their Points of Presence (PoPs). Many Internet Service Providers (ISPs) typically may not be willing or able to provide this level of cooperation.

An alternative that can circumvent the aforementioned onerousness, places nodes inside a few Points of Presence (PoPs) of cooperative Internet Service Providers (ISPs). This approach nevertheless has limitations, for example, it requires active cooperation from Internet Service Providers (ISPs) to place nodes inside their Points of Presence (PoPs), and does not measure the entire path to the destination but only a part of it.

FIG. 1 illustrates a machine implemented system 100 that uncovers detailed differences in the performance of Internet Service Provider (ISP) networks. System 100 better approximates the capabilities of an ideal system where measurement nodes can extensively and exhaustively be situated inside each Point of Presence (PoP) and each destination network in order to measure how traffic is delivered from Points of Presence (PoPs) to destination networks. However, as illustrated in FIG. 1, system 100 has measurement nodes (e.g., nodes 102 and 106) dispersed and situated at the edges of the Internet and not inside Internet Service Provider (ISP) Points of Presence (PoPs) (e.g., denoted in FIG. 1 as A, B and C). To provide good coverage with a modest number of nodes, measurement nodes 102 and 106, for instance, can employ single-ended probes to all destination networks. For example, in FIG. 1 measurement node 102 can send a single-ended probe through Internet Service Provider A and Internet Service Provider B to intranet 104. As a further example, measurement node 106 can direct two single-ended probes, one through Internet Service Provider B and Internet Service Provider A to extranet 108 and one through Internet Service Provider B to remote network 110 which can, for instance, be located on another continent (e.g., Asia, Africa, Europe, etc.). From these single-ended probes, system 100, can extract properties related to subpaths of interest—starting from the Internet Service Provider (ISP) (e.g., Internet Service Provider A and/or Internet Service Provider B, etc.) to the destination network (e.g., networks 104, 108, and 110).

While system 100, as illustrated in FIG. 1, can be easily deployed, engineering such a system can be significantly challenging. Accordingly and in order to overcome such challenges, system 100 can aggressively limit the number of probes disseminated from measurement nodes (e.g., nodes 102 and 106) in edge networks (e.g., access devices that can provide entry points into enterprise or service provider core networks). Further, system 100 can extract performance information about subpaths of interest from end-to-end probes. Additionally, since single-ended measurements from edge nodes can be inherently more noisy (e.g., the forward and reverse paths typically can be asymmetric), system 100 ensures that any inferences that it makes are robust to such sources of noise.

Hosting measurement nodes (e.g., node 102 and 106) within or inside edge networks can require that system 100 limit probing overhead so that it can comply with policies imposed by hosting networks and not overload local networks or access links. To understand the need for limiting the probing requirement, assume that there are 250,000 destination IP (Internet Protocol) prefixes (e.g., the current size of a Boarder Gateway Protocol (BGP) routing table). Further, assume, for example, that system 100 wants to measure an Internet Service Provider (ISP) within 15 minutes and it takes thirty 100-byte packets to measure one path. An approach that probes from all nodes to all prefixes can require over 60 Mbps per measurement node. As will be readily appreciated by those reasonably cognizant in this field of endeavor, such a level of sustained bandwidth usage can be prohibitive for many edge networks. Accordingly, in order to overcome this impediment system 100 can employ the following techniques to reduce overhead.

System 100, for example, instead of using IP (Internet Protocol) prefixes as destinations, can employ Boarder Gateway Protocol (BGP) atoms. Atoms can be groups of prefixes with identical routing policies such that the paths to constituent prefixes can be identical. Routing updates for such prefixes can often be carried in the same message, suggesting that their routing dynamics can be the same or similar. It is not necessary that all atoms, as inferred using Boarder Gateway Protocol (BGP) tables, are "atomic". But by employing atoms instead of prefixes can present a four-fold reduction in the number of destinations—a worthwhile trade-off.

Additionally, in order to further reduce probing requirements, system 100 can select probes based on recent routing history. Out of all the probes that a measurement node (e.g., node 102 and/or 106) can disseminate and/or propagate many probes will not necessarily traverse Internet Service Providers (ISPs) of interest and consequently are not useful for measuring those Internet Service Providers (ISPs). Thus, system 100 can employ views of recent routing from the measurement node (e.g., node 102 and/or 106) to restrict probing to those probes that are likely to traverse Internet Service Providers (ISPs) of interest. To produce such views, measurement nodes (e.g., nodes 102 and/or 106) can be requested to collect it view of routing to all the destinations. After that this view can be continuously refreshed using, for example, low-rate background probing.

In a further attempt to limit probing requirements, system 100 can eliminate redundancies. The set of probes from a measurement node (e.g., nodes 102 and/or 106) to destinations (e.g., 104, 108, and/or 110) can include many redundancies. An example redundancy is where the path of interest of one probe is contained within another. Or, if probes from two or more nodes enter the Internet Service Provider (ISP) at the same Point of Presence (PoP), only one is required. Similarly, for internal paths, a probe that traverses three Points of Presence (PoPs) can provide information about performance between three pairs of cities, and other probes that traverse individual pairs are not typically required for this purpose. Accordingly, elimination of such redundancies can lower the probing overhead, and it can also be used to balance load across nodes (e.g., nodes 102 and/or 106).

The redundancy reduction/elimination problem that needs to be overcome by system 100 can be summarized as follows. If it is assumed that system 100 can know (e.g., from a routing view) the path that would be taken by each possible probe. Out of these, system 100 will want to select a subset such that: (i) each Internet Service Provider (ISP) city to destination is probed; (ii) each internal paths between two cities is probed; and (iii) probing load at a measurement node (e.g., node 102 and/or 106) does not exceed a threshold. This problem is an instance of the set covering/packing problem that can be elucidated as follows. Given multiple sets over a universe of elements, pick a subset of input sets such that each element is included at least a given number of times (covering constraint) and no element is included more than a given number of times (packing constraint). With respect to the claimed subject matter, the input sets are probes, and the elements are destination paths, internal (city pair) paths, and measurement nodes (e.g., node 102 and/or 106). Each probe typically contains all three types of elements.

It should be noted, that the set covering/packing problem is typically NP-hard, but greedy heuristics are known to yield good solutions. Accordingly system 100 can implement one such greedy heuristic where probes are added to the measurement set until all elements are covered at least once. At each step, the probe that covers the most as yet uncovered elements is added.

To extract subpaths of interest, system 100 needs to know where an Internet Service Provider (ISP) begins and ends in the measured path. Further, to obtain a geographic view of the Internet Service Provider's (ISP's) network, system 100 can also need to map the Internet Service Provider's (ISP's) IP (Internet Protocol) addresses to their locations. IP (Internet Protocol) addresses typically can be seen in disseminated probes and can be mapped to owner Internet Service Providers (ISPs) and locations based primarily on their names which often can be embedded within this information. For instance, the name s1-gw12-sea-4-0-0.telinc.net can correspond to a router belonging to Telinc and situated in Seattle. To map IP addresses to Intranet Service Provider (ISP) and locations, system 100 can use functionality (e.g., undns) which uses encoded rules about the Internet Service Providers' (ISPs') naming convention to determine the mappings. System 100 can extend the rule set to improve the number of names that the foregoing functionality can successfully map. IP (Internet Protocol) addresses that do not have names can be mapped using methods based on majority voting, for example.

To normalize paths based on geography, system 100 can infer the rough location of destination networks. To accomplish this system 100 can use a geolocation database compiled from websites that ask uses their location. Typically, utilization of such geolocation databases can have an accuracy of 99% in determining the country of an IP address and in ascertaining more granular locations within a country can have an accuracy exceeding 80%.

Recognizing that there can be multiple sources of noise and error in data, and to ensure that inferences made by system 100 are robust to such errors, system 100 can detect each source of an erroneous data and filter it appropriately. For example, errors in DNS names or majority voting can incorrectly map an IP (Internet Protocol) address to an Internet Service Provider (ISP). To accommodate for this eventuality system 100 can check for such occurrences by observing the gathered traceroute data. IP (Internet Protocol) addresses belonging to the same Internet Service Provider (ISP) typically must appear consecutively (e.g., IP (Internet Protocol) addresses should not be separated by an IP (Internet Protocol) address that belongs to another Internet Service Provider (ISP)). Transient routing problems can cause such an anomaly as well, but where system 100 observes such an anomaly across many traceroutes, system 100 can conclude that the Internet Service Provider (ISP) of the intervening IP (Internet Protocol) address has been incorrectly assigned.

Further, noise and error can be introduced into the data where errors in DNS names or majority voting incorrectly assign an incorrect location to a router IP (Internet Protocol) address. To accommodate for this situation, system 100 can check for such errors using two sanity checks. First, the traceroute for a particular Internet Service Provider (ISP) typically should not exit and enter a city again. As before, some of these anomalies can arise because of transient routing issues; persistent issues indicate incorrect location mapping. The location mapping of IP (Internet Protocol) addresses that are frequently sandwiched between the two IP (Internet Protocol) addresses of a different location is typically incorrect.

Second, system 100 can run a speed of light test among neighbors to detect erroneous mappings. The differences in the round-trip latency observed to neighboring IP (Internet Protocol) addresses typically should be more than the minimum time it takes for light to travel between the locations of the IP (Internet Protocol) addresses. The latter time can be computed using the geographical location coordinates assigned to locations and the speed of light in fiber—this test typically can also detect problems in assignment of geographic coordinates as well. Because of asymmetric routing, a speed of light test can fail even when the underlying data is correct. If an IP (Internet Protocol) address fails this test for a majority of its neighbors, system 100 can conclude its location to the incorrect.

Depending on the Internet Service Provider (ISP), only 0.2-1.1% of traceroutes typically fail one of the above two tests. In each case, deleting the mapping of a handful of IP addresses by system 100 can resolve most of these anomalous traceroutes. These apparently faulty mappings can stem from both the facility that uses encoded rules about Internet Service Providers' (ISPs') naming conventions to determine the mappings (e.g., undns) and/or majority voting.

To detect cases where the geolocation database incorrectly infers the coordinates of a destination IP (Internet Protocol) address, system 100 can again utilize a test based on speed of light. System 100 can, for example, use traceroutes to the destination and then can compare: (i) the differences in the round trip latency between the destination and intermediate IP (Internet Protocol) addresses (e.g., whose locations system 100 knows); and (ii) the minimum time it would typically take light to travel that path. Destinations for which the former is often less than the latter can be considered to have incorrect location assignment.

Because system 100 can infer path latency using single ended measurements, the system needs to guard against inference is being confused by significant asymmetries in forward and reverse paths. To accomplish this, system 100 can discard traceroutes for which forward and reverse hop length to an IP (Internet Protocol) address of interest differs by more than three, for example. The forward hop length can typically be obtained directly from the traceroute measurement while the reverse hop length can be inferred using the remaining Time To Live (TTL) (e.g., period of time that a unit of data, for instance a record, packet, and the like, can experience before it should be discarded) in the probe response.

Further, in order to ensure against inferences being confused by either measurement nodes (e.g., node 102 and 104) being overloaded or a link between the measurement node and the Internet Service Provider (ISP) being overloaded; such overload events can make the Internet Service Provider's (ISP's) performance appear "bad". System 100 can detect such overload events by observing the variance in the round trip time from a node to the IP (Internet Protocol) address where the probe enters the Internet Service Provider (ISP). On detection of such overload events, system 100 can discard data from the node during periods when the variance is high, for example.

Figure 2:
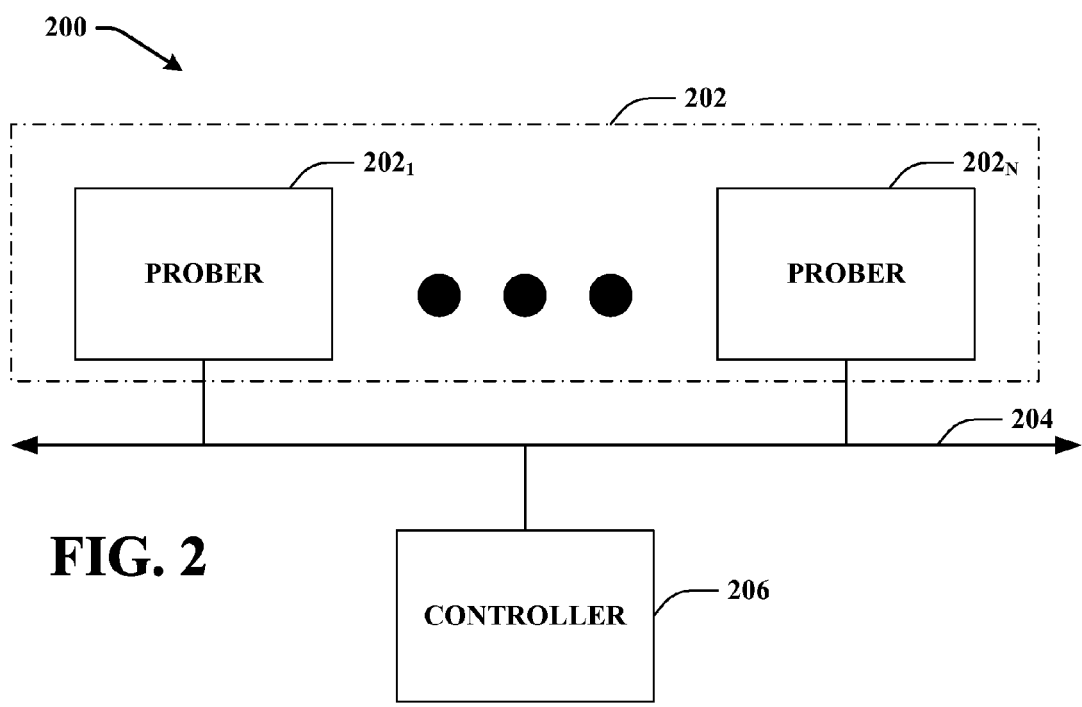
FIG. 2 depicts a machine implemented system that reveals detailed differences in the performance of Internet Service Provider (ISP) networks in accordance with one aspect of the claimed subject matter.

FIG. 2 depicts a system 200 that detects or uncovers detailed differences in the performance of Internet Service Provider (ISP) networks in accordance with an aspect of the claimed subject matter. As illustrated, system 200 can include probers $202_1 \ldots 202_N$ where N is an integer, whole number, or natural number greater than or equal one (1), and controller 206 that can be in continuous and operative, or sporadic and intermittent communication with one another via network topology 204. System 200 can continuously measure the quality of Internet Service Providers (ISPs) and thereafter aggregate raw measurement data into meaningful results. System 200 can divide the measurement process into cycles, measures one Internet Service Provider (ISP) per cycle, and integrates through list of target Internet Service Providers (ISPs). This functionality can be spread across multiple probers $202_1 \ldots 202_N$ (hereinafter collectively referred to, unless specifically noted to the contrary, as "prober 202") and a centralized controller 206. At the beginning of each cycle, controller 206 can automatically and dynamically compute/generate a list of destinations to probe and thereafter controller 206 can send the computed list to prober 202. Upon receipt of the list of destinations prober 202 can probe destinations accordingly. Once the probers 202 have completed their tasks, controller 206 can proceed to the next cycle.

As illustrated, prober 202 can be implemented entirely in software, hardware, and/or a combination of software and/or hardware. Further, prober 202 can be incorporated within and/or associated with other compatible components, such as devices and/or appliances that can include processors (e.g., desktop computers, laptop computers, notebook computers, cell phones, smart phones, personal digital assistants, multimedia Internet enabled mobile phones, multimedia players, and the like). Prober 202 can be responsible for probing to destinations and maintaining a fresh routing view to all Border Gateway Protocol (BGP) atoms. Prober 202 can be in one of four states—idle, initializing, ready, or busy. Idle probers (e.g., prober 202) typically are not being actively used for measurement, because they are co-located with an active prober; generally only one active prober 202 is used for site because others do not contributed additional paths. Initializing probers (e.g., prober 202) can be located at sites from which no fresh routing view has emanated and which are in the process of acquiring a fresh routing view. Acquiring routing views can normally take several hours. Ready probers (e.g., prober 202) can be located at sites from which fresh routing views have been obtained/required but ready probers are typically not county probing any Internet Service Provider (ISP). Busy probers (e.g., prober 202) can actively probe an Internet Service Provider (ISP).

In addition to Internet Service Provider (ISP)-specific probing, active probers (e.g., prober 202) can probe to all destinations at a low rate to maintain a fresh routing view. Due to the large number of atoms (roughly 55,000), probers can spread this task over the course of the day.

In order to effectuate probing to destinations and maintaining fresh routing views to all Border Gateway Protocol (BGP) atoms, prober 202 can utilize a customized version of traceroute for probing paths. For speed, this customized version can probe the first eight hops simultaneously, then the next four, then the next two; the remaining homes can thereafter be probed sequentially, for example. The reduction in the number of hops that are probed simultaneously can minimize the chances of triggering an intrusion detection system at the destination network. To minimize the chances that probes take different router-level paths to the destination due to load-balancing routers, all the packets can have the same source/destination port numbers and type of service (ToS) value. Multiple destinations can be probed in parallel subject to the configured maximum probing rate.

Controller 206, like prober 202, can be implemented entirely in software, hardware, and/or as a combination of software and/or hardware. Further, controller 206 can be any type of machine that includes a processor and is capable of effective communication with network topology 104. Illustrative machines that can comprise controller 206 can include desktop computers, server class computing devices, cell phones, smart phones, laptop computers, notebook computers, Tablet PCs, consumer and/or industrial devices and/or appliances, hand-held devices, personal digital assistants, multimedia Internet mobile phones, and the like.

Network topology 204 can include any viable communication and/or broadcast technology, for example, wide and/or wireless modalities and/or technologies can be utilized to effectuate the claimed subject matter. Moreover network topology 204 can include utilization of Personal Area Networks (PANs), Local Area Networks (LANs), Campus Area Networks (CANs), Metropolitan Area Networks (MANs), extranets, intranets, the Internet, Wide Area Networks (WANs)—both centralized and distributed—and/or any combination, permutation, and/or aggregation thereof.

While system 200 as depicted FIG. 2 can be considered conceptually simple, there are two major challenges in executing the process above. First, as a large-scale distributed system, for example, system 200 can have to deal with a continuously evolving environment. Nodes die and reappear, routing and topology changes, software evolves, etc. Second, in order to measure target Internet Service Providers (ISPs) as frequently as possible, system 200 has to maximize the time it spends probing while minimizing other overhead. Thus, unless system 200 is not careful, even the simple task of transferring a single file to all probes can run into tens of minutes if a prober 202 is unresponsive.

Figure 3:
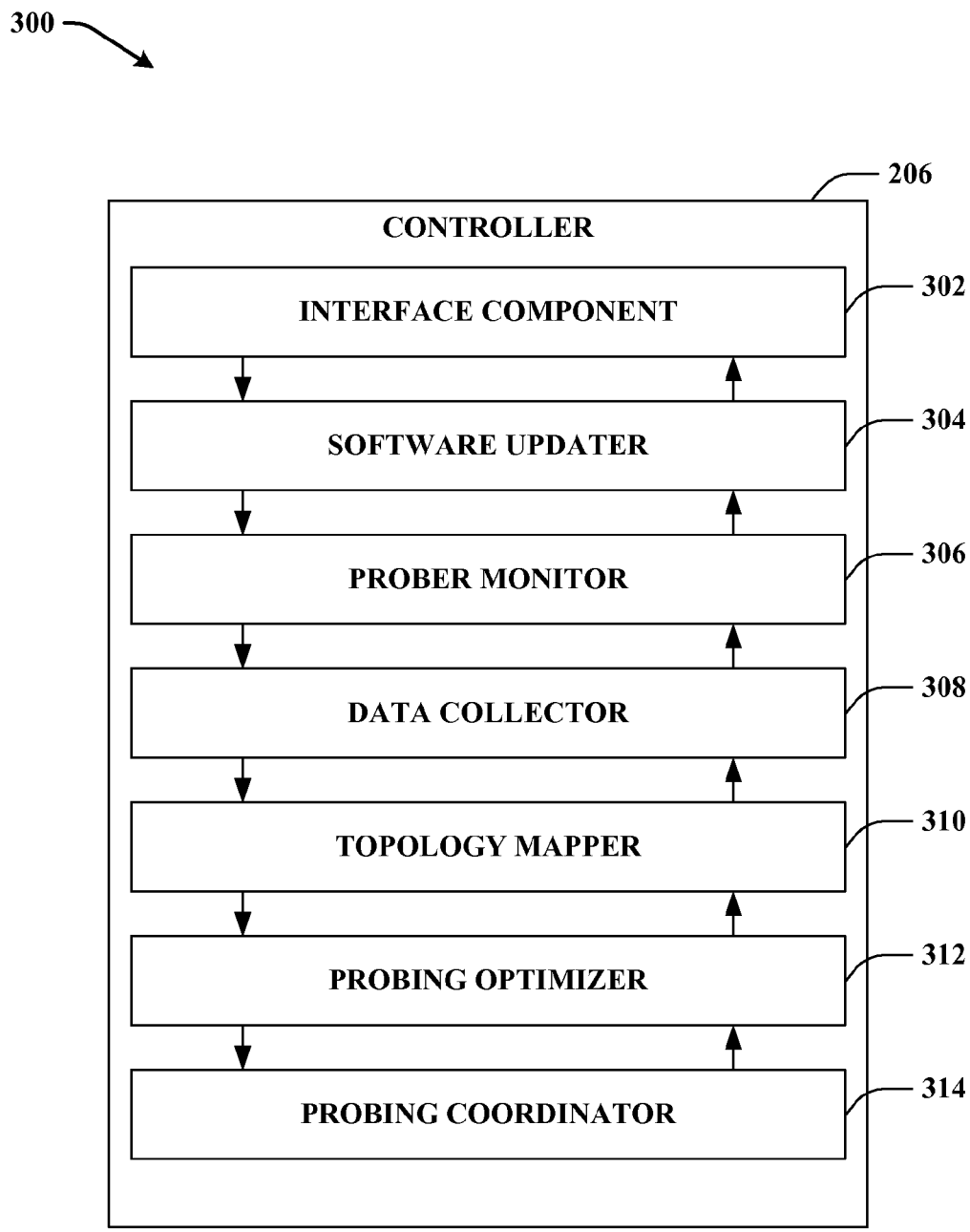
FIG. 3 provides a more detailed depiction of an illustrative controller that that exposes detailed differences in the performance of Internet Service Provider (ISP) networks in accordance with an aspect of the claimed subject matter.

FIG. 3 provides a more detailed depiction 300 of controller 206 in accordance with an aspect of the claimed subject matter. As illustrated controller 206 can include interface component 302, software updater 304, prober monitor 306, data collector 308, topology manager 310, probing optimizer 312, and probing coordinator 314. Interface component 302 (hereinafter referred to as "interface 302") can receive and/or propagate data to and/or from a multitude of sources, such as prober 202. Data received and/or disseminated can include lists of target Internet Service Providers (ISPs) that prober 202 should interrogate and routing views and/or raw measurement data retrieved from, or sent by prober 202. Additionally, interface 302 can receive or obtain data associated with client applications, services, users, clients, devices, and/or entities involved with a particular transaction, a portion of a transaction, and the like.

Interface 302 can provide various adapters, connectors, channels, communication pathways, etc. to integrate the various components included in system 300 into virtually any operating system and/or database system and/or with one another. Additionally, interface 302 can provide various adapters, connectors, channels, communication modalities, and the like, that can provide for interaction with various components that can comprise system 300, and/or any other component (external and/or internal), data, and the like, associated with system 300.

Software updater 304 can ensure that all probers (e.g., prober 202) have up-to-date probing software and configuration files. Where software updater 304 finds a node (e.g., prober 202) with stale files, it can install the latest software. Typically there are only two configuration files for probers: a list of IP (Internet Protocol) addresses to probe within atoms for obtaining the routing view and a list of IP (Internet Protocol) prefixes to which they should never probe. Because Border Gateway Protocol (BGP) tables can change, for example, once a day, software updater 304 can re-compute atoms and randomly select an IP (Internet Protocol) to probe in it. The second list can typically contain destination networks that affirmatively request not to be probed.

Probe monitor 306 can maintain a local view of the state of each prober (e.g., prober 202) by polling them periodically.

Data collector 308 can copy or retrieve data generated by the probers (e.g., prober 202) back to controller 206. There can be two types of data files: routing view files and probing result files. The former can be processed by topology mapper (discussed below) to maintain a fresh view of the Internet Service Provider (ISP) topology, and the latter can be used by a data analyzer (discussed infra) to analyze Internet Service Provider (ISP) performance.

Topology mapper 310 can recover Internet Service Provider (ISP) topologies from routing view files. Topology mapper 310 accomplishes this by determining where an Internet Service Provider (ISP) begins and ends. Topology mapper 310 can also ascertain a geographic view of the Internet Service Provider's (ISP's) network, and maps the Internet Service Provider's (ISP's) IP (Internet Protocol) addresses to their locations. Accordingly, topology mapper 310 can map IP (Internet Protocol) addresses seen in disseminated probes to owner Internet Service Providers (ISPs) and locations primarily based on their names which often are embedded within this information. For instance, the name "a1-gw08-bos-5-0-0.telcom.net" can correspond to a router belonging to a telecommunications provider, Telcom, situated in Boston. To map IP (Internet Protocol) addresses to Internet Service Provider (ISP) and location, topology mapper 310 can employ a facility which uses encoded rules about the Internet Service Providers' (ISPs') naming conventions to determine and mappings (e.g., undns). Further, to map IP (Internet Protocol) addresses that do not have names, topology mapper 310 can use methods based on majority voting.

In order to normalize paths based on geography, topology mapper 310 can infer the rough location of destination networks. For example, topology mapper 310 can employ a geolocation database typically compiled from websites that ask users for their location.

Additionally, topology mapper 310 that can convert the IP level routing view from each prober (e.g., 202) into a city level view. Unlike other systems that measure Internet Service Provider (ISP) topologies but once, the claimed subject matter, and in particular network topology mapper 310, evolves its view of Internet Service Provider (ISP) topologies as such topologies change over time. Thus, topology mapper 310 can expire IP (Internet Protocol) addresses and links in developed topological views that have not been observed for a period of time. The expiration period can represent a trade-off between the freshness of data and the additional cost of processing newly discovered IP (Internet Protocol) addresses and links compared to those that have been observed before. Based on the assumption that Internet Service Provider (ISP) topologies do not change rapidly, the expiration period can be configured to be one week, for example. Additionally, to account for the possibility of DNS name changes, topology mapper 310 can re-query names that are more than a week old, for instance. Furthermore, topology mapper 310 can also continuously monitor the quality of the current routing and topological views. For example, a monitoring script can look for indicators such as the number of IP (Internet Protocol) addresses in a Internet Service Provider (ISP), the number of IP (Internet Protocol) addresses not resolved by the mechanism that uses encoded rules about Internet Service Providers' (ISPs') naming conventions to determine mappings (e.g., undns), and the number of anomalous traceroutes. The output of such a script can provide guidance as to whether any action, such as adding new rules needs to be taken with respect to the facility that employs encoded rules about Internet Service Providers' (ISPs') naming conventions in order to determine mappings (e.g., undns). Additionally, in order to enable analysis over historical data, topology mapper 310 can persist the current view of Internet Service Providers' (ISPs') topology once a day, for example.

Probing optimizer 312 can combine a list of probers (e.g., probers 202) with fresh routing views (e.g., obtained from prober monitor 306) and the city level routing views of these probers (e.g., obtained from topology mapper 310) to generate lists of destinations to probe for the target Internet Service Provider (ISP). Probing optimizer 312 can utilize redundancy elimination mechanisms described earlier.

Probing coordinator 314 can drive the measurement cycles. At the beginning of the cycle, probing coordinator 314 can retrieve a list of destinations for the current Internet Service Provider (ISP) and can translate each list to its corresponding prober (e.g. prober 202), for example, using a customized version of parallel scp. This customized version of parallel scp can, for instance, ensure that all files are either completely copied or not copied in a preconfigured time period (e.g., 60 seconds). Thus, measurement cycles will not be blocked by any slow transfers. Probing coordinator 314 can periodically obtain the states of all probers from prober monitor 306. When probing coordinator 314 finds that there are no busy probers, it can proceed to the next cycle.

To prevent a measurement cycle from being blocked by a prober with low network bandwidth or heavy CPU load, probing coordinator 314 can use a timeout period to define the maximum time the prober can spend probing in a cycle. After this period, all probers typically will be ready for the next cycle. The timeout generally can be set to 15 minutes. A prober can normally measure approximately 9000 paths in this period.

A unique aspect of the claimed subject matter is that all probers can be synchronized every 15 minutes so that they may stop measuring a Internet Service Provider (ISP) at roughly the same time. Much of the complexity of the claimed subject matter can stem from this. Alternative implementations can also be used, such as performing most tasks sequentially. While such sequential implementation can be easier, it nevertheless has high overhead in terms of how frequently new measurement cycles can be commenced. A delay in any of the functions (e.g., software update or gathering the results) can lead to the slowdown in the entire chain. Accordingly, in the case of the claimed subject matter, most tasks are typically performed in parallel, and different tasks do not wait for each other. While this version can be more challenging to implement, it meets its goal of maximizing the time spent probing. The only tasks that typically do not necessarily happen in parallel can be transferring the list of destinations at the beginning of each cycle and checking their status and the end of each cycle.

Figure 4:
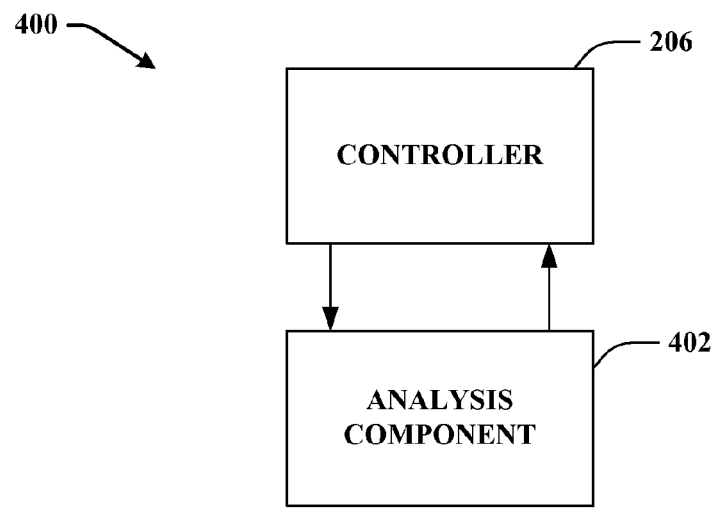
FIG. 4 provides illustration of machine implement a controller and data analysis component operating in conjunction to identify detailed differences in the performance of Internet Service Provider (ISP) networks in accordance with an aspect of the claimed subject matter.

FIG. 4 illustrates an aspect of a system 400 that facilitates and effectuates identifies detailed differences in the performance of Internet Service Provider (ISP) networks. As illustrated system 400 can include controller 206 that can, as stated supra, at the beginning of each measurement cycle compute, create, determine, or infer a list of destinations to probe for each prober 202 to interrogate, propagates the identified list to appropriate probers 202, and thereafter receives raw result data back from the associated probers 202 once the probers 202 have completed their tasks. Raw result data files received or obtained from probers 202 can typically be associated with sequence numbers that can identify files generated by each prober in the same cycle. Nevertheless, as will be appreciated by those cognizant in the art, other sequencing schemes, devices, orderings, and/or strategies can be utilized without departing from the intent, sprit, and/or ambit of the claimed subject matter.

System 400 can also include analysis component 402 that can convert raw measurement result data received or obtained from probers 202 into results that can be employed to provide meaningful and cogent comparison of Internet Service Providers (ISPs). Analysis component 402 can receive, via controller 206, raw probing result data files from probers 202, extract information about subpaths of interest from the raw measurement files, produce intermediate files that can contain latency information about all visible paths of target Internet Service Providers (ISPs) in a particular cycle, and aggregate latency samples of a path into an estimate for that path in that cycle. Additionally, analysis component 402 can aggregate across cycles to obtain an average view of the latency of a path.

Figure 5:
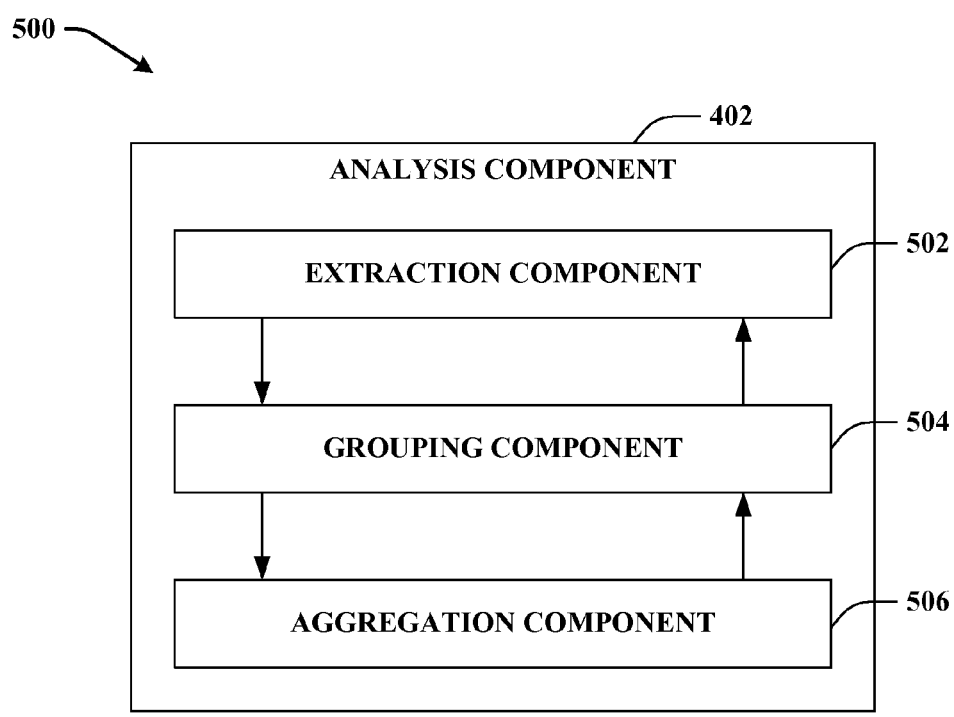
FIG. 5 provides a more detailed depiction of a data analysis component that divulges detailed differences in the performance of Internet Service provider networks in accordance with an aspect of the claimed subject matter.

FIG. 5 provides a more detailed depiction 500 of analysis component 402 in accordance with an aspect of the claimed subject matter. Analysis component 402 can include extraction component 502, grouping component 504, and aggregation component 506. Extraction component 502 upon receipt of probing result data files received from probers 202, via controller 206, can extract information about the subpaths of interest from the raw measurement files. Beast typically a paths between pairs of cities of an Internet Service Provider (ISP) and between an Internet Service Provider's (ISP's) city and the destination at them. Below is an example of a traceroute path observed while measuring a typical telecommunication network:

| Traceroute | 123.211.123.46 | → | 36.111.6.62 | (atom 12345) |
|---|---|---|---|---|
| 1 | * | | 0.542 ms | |
| 2 | 13.123.211.133 | | 6.708 ms | (TelCo New York) |
| 3 | 13.123.0.101 | | 32.232 ms | (TelCo Boston) |
| 4 | 36.111.6.1 | | 36.345 ms | (atom 12345) |

Using the topology information, extraction component 502 can determine that the second hop and the third hop are in TelCo New York and Boston. Therefore, extraction component 502 can extract the latency sample for the path New York→Boston. While a traceroute does not reach the exact IP (Internet Protocol) probed, it nevertheless ends in the same atom, and thus extraction component 502 can extract the latency sample for the path New York→Atom12345 and Boston→Atom12345 from the traceroute. Generally, samples for paths that end in an atom are extracted only for traceroutes that end in the same atom as the one being probed.

After processing the raw measurement files generated in a cycle, an intermediate file can be produced that contains latency information about all the visible paths of a target Internet Service Provider (ISP) in a particular cycle. Given that a path can be measured from multiple sources, a grouping component 504 can be utilized to group the latency samples of a path by the source where the measurement is taken. This enables the system, and more particularly, grouping component 504, to identify and discard bad latency samples due to asymmetric paths. In addition, grouping component 504 can also filter out bad samples due to overloaded node or nearby links.

The remaining latency samples of a path can be aggregated by an aggregation component 506 into one estimate for the path in that cycle. There are many methods to accomplish this, for example, arithmetic mean, geometric mean, median, etc. Given that the latency samples sometimes can be distorted by unpredictable router response time, aggregation component 506 can utilize a method that is robust to both small and large outliers and yields representative results. Accordingly, aggregation component 506 can utilize the median when aggregating multiple latency samples for the same path from the same source and then can use the arithmetic mean when aggregating across sources.

When aggregating across cycles to obtain an average view of the latency of a path, aggregation component 506 can produce two values. The first value can be the trimmed mean which can be computed by taking the mean of the latency estimates between the 10th and the 90th percentile of all the latency estimates, for example. The second value can capture the variance in the latency across cycles using the difference between the 90th and 10th percentile of all of the latency estimates, for instance.

Figure 6:
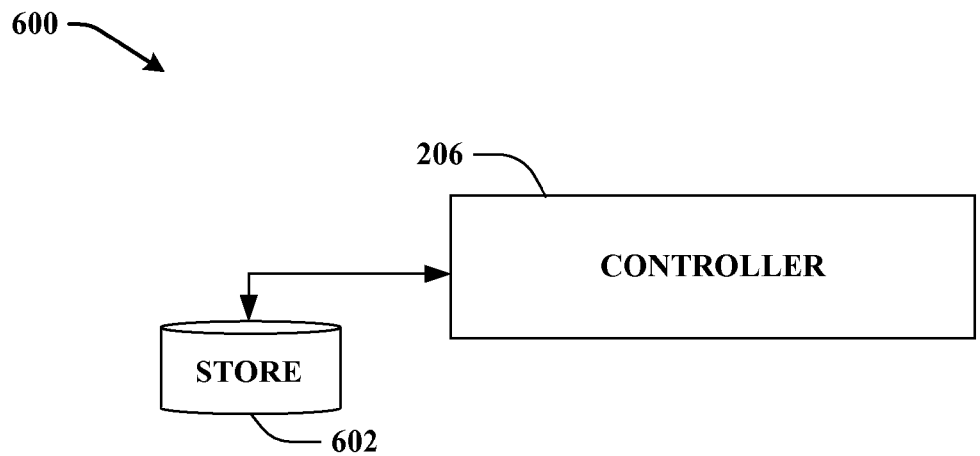
FIG. 6 illustrates a system implemented on a machine that uncovers detailed differences in the performance of Internet Service Provider (ISP) networks in accordance with an aspect of the claimed subject matter.

FIG. 6 depicts an aspect of a system 600 that exposes detailed differences in the performance of Internet Service Provider (ISP) networks. System 600 can include store 602 that can include any suitable data necessary for controller 206 to facilitate it aims. For instance, store 602 can include information regarding user data, data related to a portion of a transaction, credit information, historic data related to a previous transaction, a portion of data associated with purchasing a good and/or service, a portion of data associated with selling a good and/or service, geographical location, online activity, previous online transactions, activity across disparate network, activity across a network, credit card verification, membership, duration of membership, communication associated with a network, buddy lists, contacts, questions answered, questions posted, response time for questions, blog data, blog entries, endorsements, items bought, items sold, products on the network, information gleaned from a disparate website, information gleaned from the disparate network, ratings from a website, a credit score, geographical location, a donation to charity, or any other information related to software, applications, web conferencing, and/or any suitable data related to transactions, etc.

It is to be appreciated that store 602 can be, for example, volatile memory or non-volatile memory, or can include both volatile and non-volatile memory. By way of illustration, and not limitation, non-volatile memory can include read-only memory (ROM), programmable read only memory (PROM), electrically programmable read only memory (EPROM), electrically erasable programmable read only memory (EEPROM), or flash memory. Volatile memory can include random access memory (RAM), which can act as external cache memory. By way of illustration rather than limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM) and Rambus dynamic RAM (RDRAM). Store 602 of the subject systems and methods is intended to comprise, without being limited to, these and any other suitable types of memory. In addition, it is to be appreciated that store 602 can be a server, a database, a hard drive, and the like.

Figure 7:
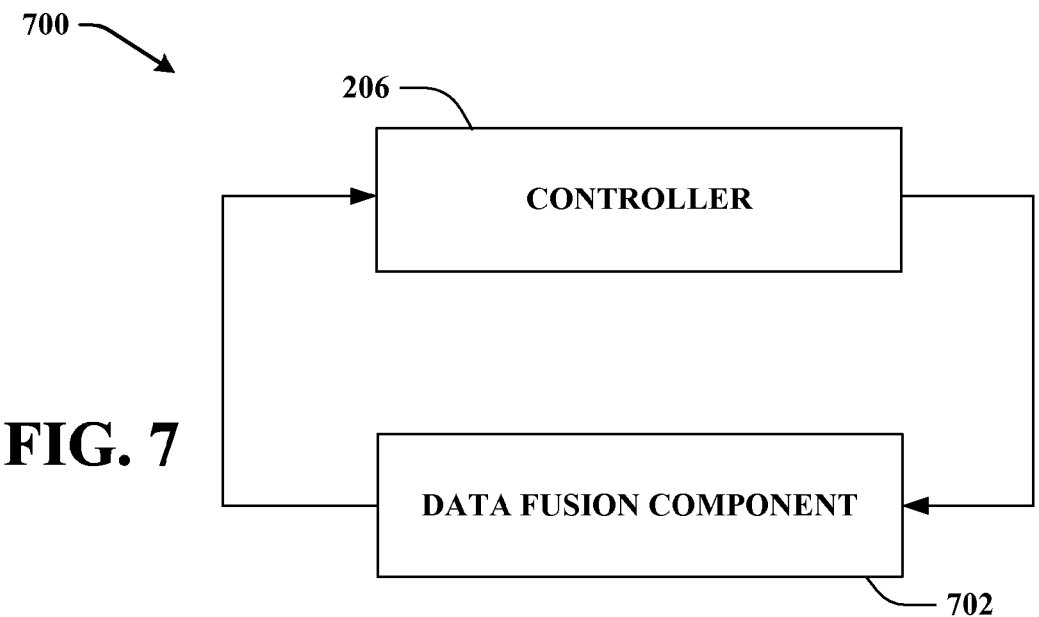
FIG. 7 provides a further depiction of a machine implemented system that divulges detailed differences in the performance of Internet Service Provider (ISP) networks in accordance with an aspect of the claimed subject matter.

FIG. 7 provides yet a further depiction of a system 700 that reveals detailed differences in the performance of Internet Service Provider (ISP) networks in accordance with an aspect of the claimed subject matter. As depicted, system 700 can include a data fusion component 702 that can be utilized to take advantage of information fission which may be inherent to a process (e.g., receiving and/or deciphering inputs) relating to analyzing inputs through several different sensing modalities. In particular, one or more available inputs may provide a unique window into a physical environment (e.g., an entity inputting instructions) through several different sensing or input modalities. Because complete details of the phenomena to be observed or analyzed may not be contained within a single sensing/input window, there can be information fragmentation which results from this fission process.

These information fragments associated with the various sensing devices may include both independent and dependent components.

The independent components may be used to further fill out (or span) an information space; and the dependent components may be employed in combination to improve quality of common information recognizing that all sensor/input data may be subject to error, and/or noise. In this context, data fusion techniques employed by data fusion component 702 may include algorithmic processing of sensor/input data to compensate for inherent fragmentation of information because particular phenomena may not be observed directly using a single sensing/input modality. Thus, data fusion provides a suitable framework to facilitate condensing, combining, evaluating, and/or interpreting available sensed or received information in the context of a particular application.

Figure 8:
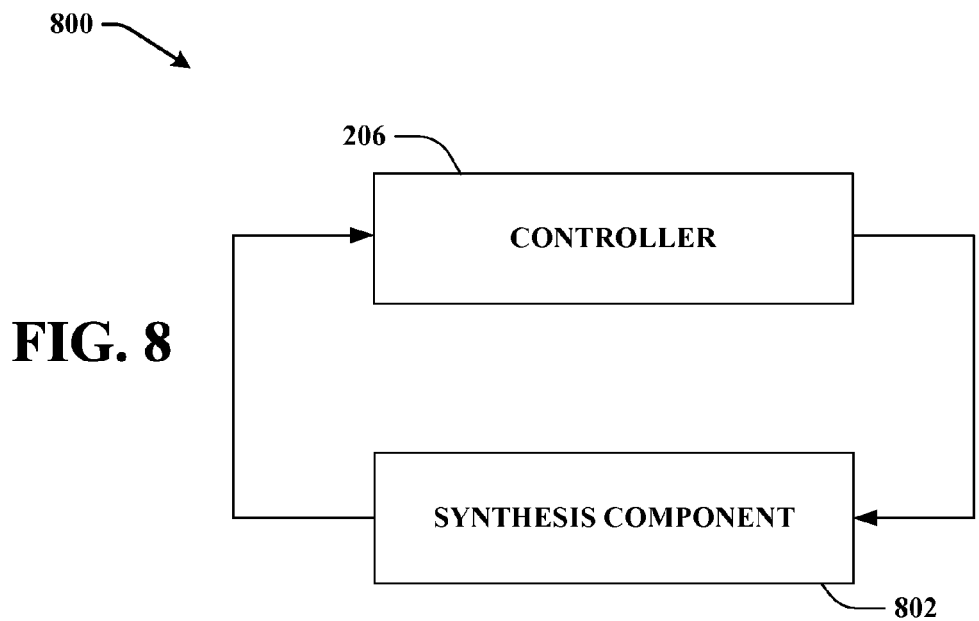
FIG. 8 illustrates yet another aspect of the machine implemented system that reveals detailed differences in the performance of Internet Service Provider (ISP) networks in accordance with an aspect of the claimed subject matter.

FIG. 8 provides a further depiction of a system 800 that divulges detailed differences in the performance of Internet Service Provider (ISP) networks in accordance with an aspect of the claimed subject matter. As illustrated controller 206 can, for example, employ synthesizing component 802 to combine, or filter information received from a variety of inputs (e.g., text, speech, gaze, environment, audio, images, gestures, noise, temperature, touch, smell, handwriting, pen strokes, analog signals, digital signals, vibration, motion, altitude, location, GPS, wireless, etc.), in raw or parsed (e.g. processed) form. Synthesizing component 802 through combining and filtering can provide a set of information that can be more informative, or accurate (e.g., with respect to an entity's communicative or informational goals) and information from just one or two modalities, for example. As discussed in connection with FIG. 7, the data fusion component 702 can be employed to learn correlations between different data types, and the synthesizing component 802 can employ such correlations in connection with combining, or filtering the input data.

Figure 9:
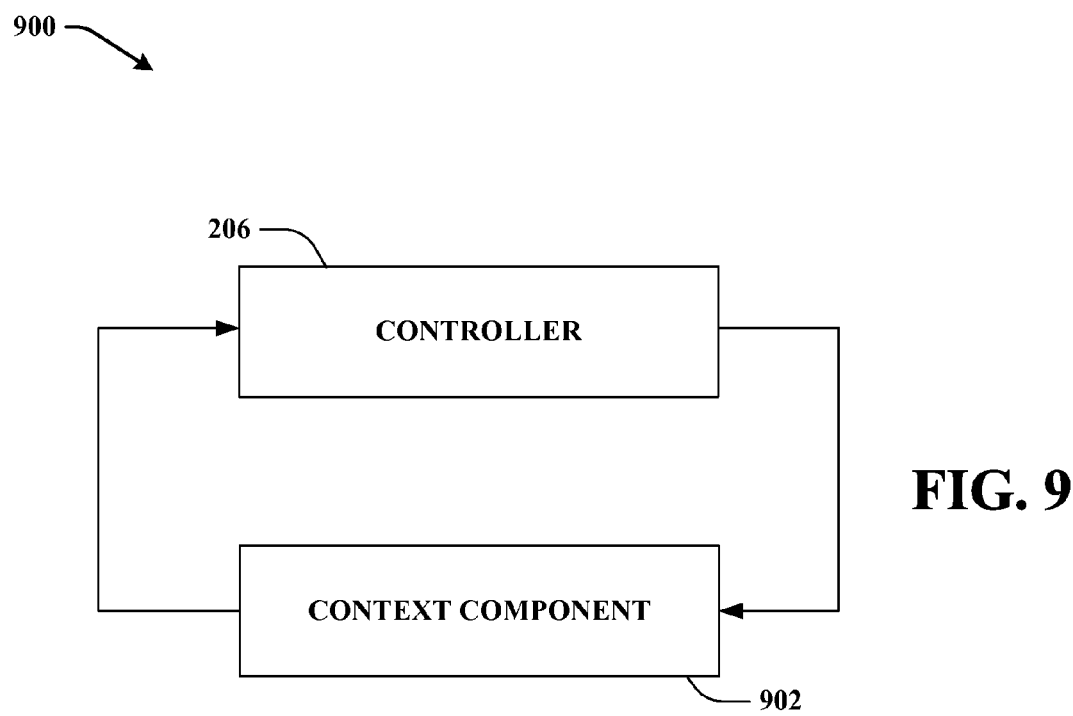
FIG. 9 depicts a further illustrative aspect of the machine implemented system that identifies detailed differences in the performance of Internet Service Provider (ISP) networks in accordance with an aspect of the claimed subject matter.

FIG. 9 provides a further illustration of a system 900 that exposes detailed differences in the performance of Internet Service Provider (ISP) networks in accordance with an aspect of the claimed subject matter. As illustrated controller 206 can, for example, employ context component 902 to determine context associated with a particular action or set of input data. As can be appreciated, context can play an important role with respect understanding meaning associated with particular sets of input, or intent of an individual or entity. For example, many words or sets of words can have double meanings (e.g., double entendre), and without proper context of use or intent of the words the corresponding meaning can be unclear thus leading to increased probability of error in connection with interpretation or translation thereof. The context component 902 can provide current or historical data in connection with inputs to increase proper interpretation of inputs. For example, time of day may be helpful to understanding an input—in the morning, the word "drink" would likely have a high a probability of being associated with coffee, tea, or juice as compared to be associated with a soft drink or alcoholic beverage during late hours. Context can also assist in interpreting uttered words that sound the same (e.g., steak and, and stake). Knowledge that it is near dinnertime of the user as compared to the user camping would greatly help in recognizing the following spoken words "I need a steak/stake". Thus, if the context component 902 had knowledge that the user was not camping, and that it was near dinnertime, the utterance would be interpreted as "steak". On the other hand, if the context component 902 knew (e.g., via GPS system input) that the user recently arrived at a camping ground within a national park; it might more heavily weight the utterance as "stake".

In view of the foregoing, it is readily apparent that utilization of the context component 902 to consider and analyze extrinsic information can substantially facilitate determining meaning of sets of inputs.

Figure 10:
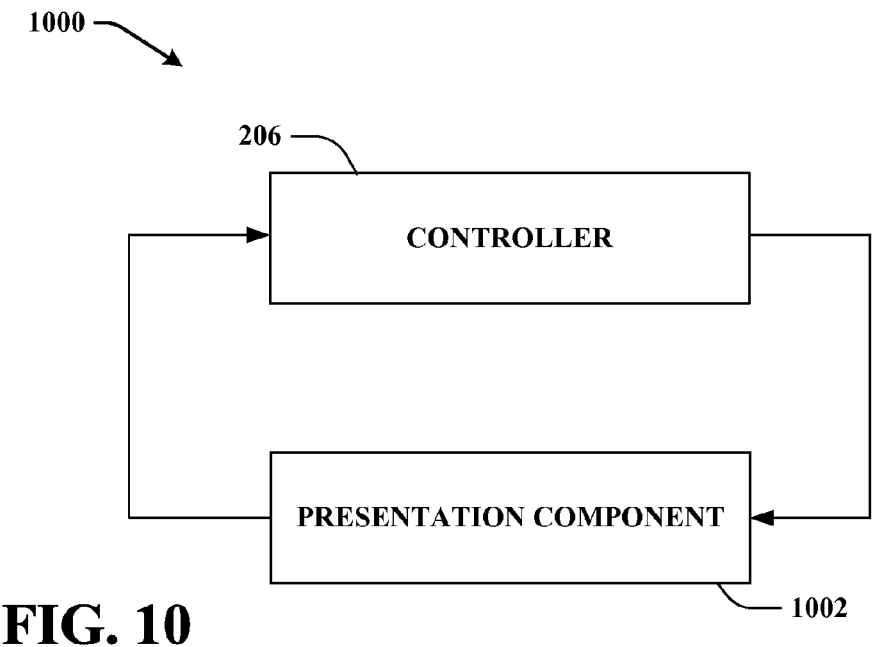
FIG. 10 illustrates another illustrative aspect of a system implemented on a machine that discovers detailed differences in the performance of Internet Service Provider (ISP) networks in accordance with an aspect of the claimed subject matter.

FIG. 10 a further illustration of a system 1000 that identifies detailed differences in the performance of Internet Service Provider (ISP) networks in accordance with an aspect of the claimed subject matter. As illustrated, system 1000 can include presentation component 1002 that can provide various types of user interface to facilitate interaction between a user and any component coupled to controller 206. As illustrated, presentation component 1002 is a separate entity that can be utilized with controller 206. However, it is to be appreciated that presentation component 1002 and/or other similar view components can be incorporated into controller 206 and/or a standalone unit. Presentation component 1002 can provide one or more graphical user interface, command line interface, and the like. For example, the graphical user interface can be rendered that provides the user with a region or means to load, import, read, etc., data, and can include a region to present the results of such. These regions can comprise known text and/or graphic regions comprising dialog boxes, static controls, drop-down menus, list boxes, pop-up menus, edit controls, combo boxes, radio buttons, check boxes, push buttons, and graphic boxes. In addition, utilities to facilitate the presentation such as vertical and/or horizontal scrollbars for navigation and toolbar buttons to determine whether a region will be viewable can be employed. For example, the user can interact with one or more of the components coupled and/or incorporated into controller 206.

Users can also interact with regions to select and provide information via various devices such as a mouse, roller ball, keypad, keyboard, and/or voice activation, for example. Typically, the mechanism such as a push button or the enter key on the keyboard can be employed subsequent to entering the information in order to initiate, for example, a query. However, it is to be appreciated that the claimed subject matter is not so limited. For example, nearly highlighting a checkbox can initiate information conveyance. In another example, a command line interface can be employed. For example, the command line interface can prompt (e.g., via text message on a display and an audio tone) the user for information via a text message. The user can then provide suitable information, such as alphanumeric input corresponding to an option provided in the interface prompt or an answer to a question posed in the prompt. It is to be appreciated that the command line interface can be employed in connection with a graphical user interface and/or application programming interface (API). In addition, the command line interface can be employed in connection with hardware (e.g., video cards) and/or displays (e.g., black-and-white, and EGA) with limited graphic support, and/or low bandwidth communication channels.

Figure 11:
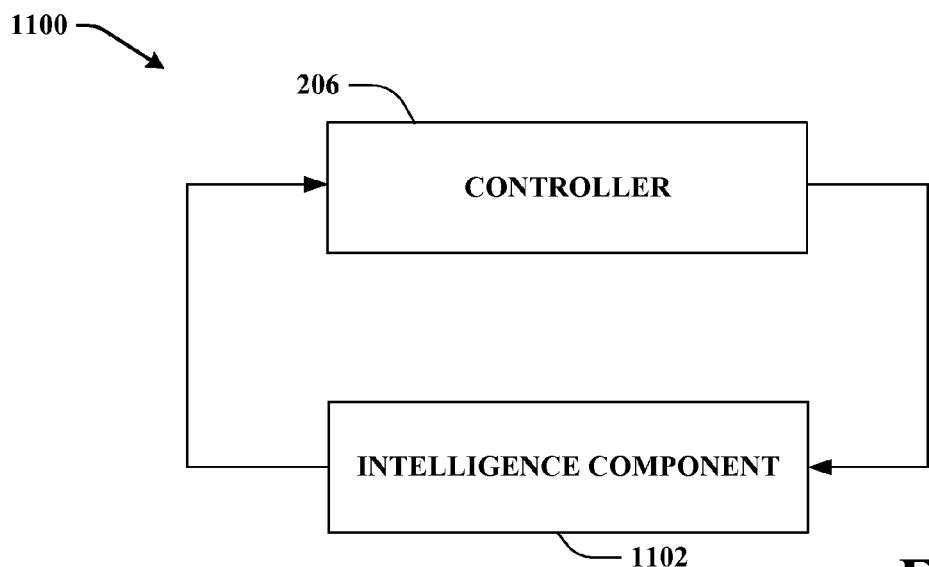
FIG. 11 depicts yet another illustrative aspect of a system that uncovers detailed differences in the performance of Internet Service Provider (ISP) networks in accordance with an aspect of the claimed subject matter.

FIG. 11 depicts a system 1100 that divulges detailed differences in the performance of Internet Service Provider (ISP) networks in accordance with an aspect of the subject matter as claimed. Accordingly, as illustrated, system 1100 can include an intelligence component 1102 that can employ a probabilistic based or statistical based approach, for example, in connection with making determinations or inferences. Inferences can be based in part upon explicit training of classifiers (not shown) before employing system 200, or implicit training based at least in part upon system feedback and/or users previous actions, commands, instructions, and the like during use of the system. Intelligence component 1102 can employ any suitable scheme (e.g., numeral networks, expert systems, Bayesian belief networks, support vector machines (SVMs), Hidden Markov Models (HMMs), fuzzy logic, data fusion, etc.) in accordance with implementing various automated aspects described herein. Intelligence component 1102 can factor historical data, extrinsic data, context, data content, state of the user, and can compute cost of making an incorrect determination or inference versus benefit of making a correct determination or inference. Accordingly, a utility-based analysis can be employed with providing such information to other components or taking automated action. Ranking and confidence measures can also be calculated and employed in connection with such analysis.

Figure 12:
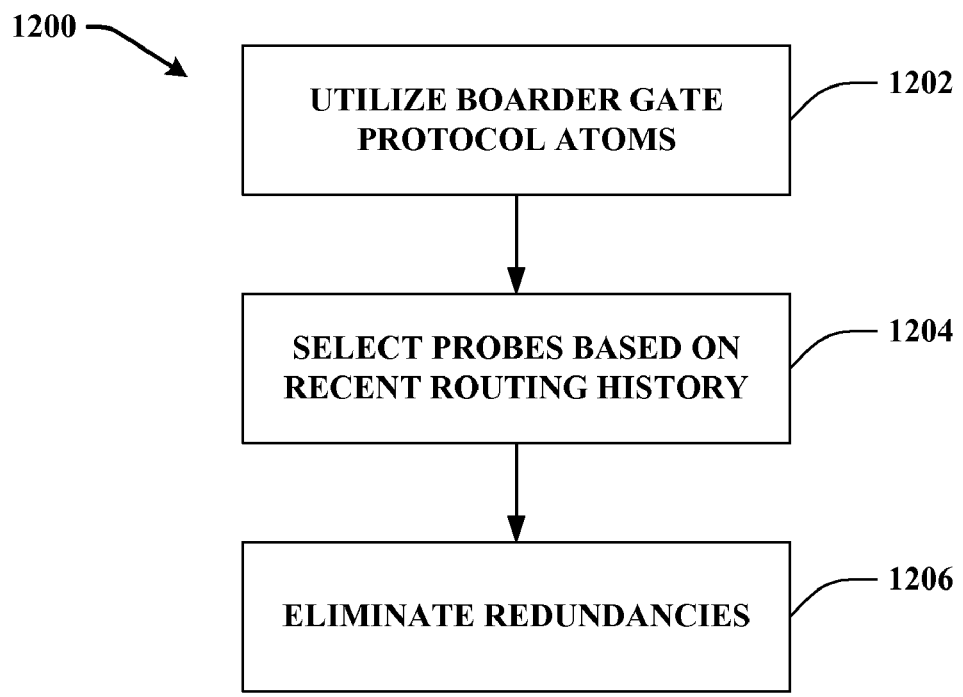
FIG. 12 illustrates a flow diagram of a machine implemented methodology that that uncovers detailed differences in the performance of Internet Service Provider (ISP) networks in accordance with an aspect of the claimed subject matter.

In view of the exemplary systems shown and described supra, methodologies that may be implemented in accordance with the disclosed subject matter will be better appreciated with reference to the flow chart of FIG. 12. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter. Additionally, it should be further appreciated that the methodologies disclosed hereinafter and throughout this specification are capable of being stored on an article of manufacture to facilitate transporting and transferring such methodologies to computers.

The claimed subject matter can be described in the general context of computer-executable instructions, such as program modules, executed by one or more components. Generally, program modules can include routines, programs, objects, data structures, etc. that perform particular tasks or implement particular abstract data types. Typically the functionality of the program modules may be combined and/or distributed as desired in various aspects.

FIG. 12 illustrates an illustrative methodology 1200 that exposes, identifies, reveals, or discovers detailed differences in the performance of Internet Service Provider (ISP) networks in accordance with an aspect of the claimed subject matter. Methodology 1200 can be employed by components of the claimed subject matter in order to reduce the number of probes that need to be disseminated in order to comply with policies typically imposed by hosting networks and not to overload the local network or access links. Method 1200 can commence at 1202 where Boarder Gateway Protocol (BGP) atoms can be utilized instead of employing IP (Internet Protocol) prefixes as is typical. Boarder Gateway Protocol (BGP) atoms can be groups of prefixes with identical routing policies such that the paths to constituent prefixes are identical. Routing updates for such prefixes can often be carried in the same message, suggesting that their routing dynamics will also be similar. At 1202 is not necessary that all actions, as inferred using Border Gateway Protocol (BGP) tables, are "atomic". But by using atoms instead of prefixes can present a fourfold reduction in the number of destinations.

Out of all the probes that a measurement node can distribute or propagate, many do not even traverse an Internet Service Provider (ISP) of interest and thus are not typically useful for measuring that Internet Service Provider (ISP). Accordingly, at 1204 a view of recent routing from a measurement node can be obtained and utilized to restrict internal probing to those probes that are likely to traverse an Internet Service Provider (ISP) of interest and thus probes can be selected based on recent routing history.

At 1206 redundancies can be eliminated. The set of probes from a measurement node to destinations can include many redundancies. An example redundancy is where the path of interest of one probe is contained within another. Or, if probes from two nodes enter the Internet Service Provider (ISP) at the same Point of Presence (PoP), only one is required. Similarly, for internal paths, a probe that traverses three Points of Presence (PoPs) can provide information about performance between three pairs of cities, and other probes that traverse individual pairs are not required for this purpose. Thus, eliminating such redundancies can lower the probing overhead, and can also be used to balance load across nodes.

The redundancy reduction problem can be expressed as follows. Suppose it is known (e.g., from the routing view) the path that would be taken by each possible probe. Out of these, a subset needs to be selected such that: (i) each Internet Service Provider (ISP) city to destination network is probed; (ii) each internal path between two cities is probed; and (iii) the probing load at a measurement node does not exceed a threshold. Such a problem can be viewed as an instance of the set covering/packing problem: given multiple sets over a universe of elements, take a subset of input sets such that each element is included at least a given number of times (covering constraint) and no element is included more than a given number of times (packing constraint). In this case, the input sets are probes, and the elements are destination paths, internal (city pair) paths, and measurement nodes. Each probe typically contains all three types of elements. As noted infra, the set covering/packing problem is NP-hard, but greedy heuristics are known to yield good solutions. One such greedy heuristic that can be used necessitates adding probes to the measurement set until all elements are covered at least once. At each step, the probe that covers the most as yet uncovered elements is added.

Figure 13:
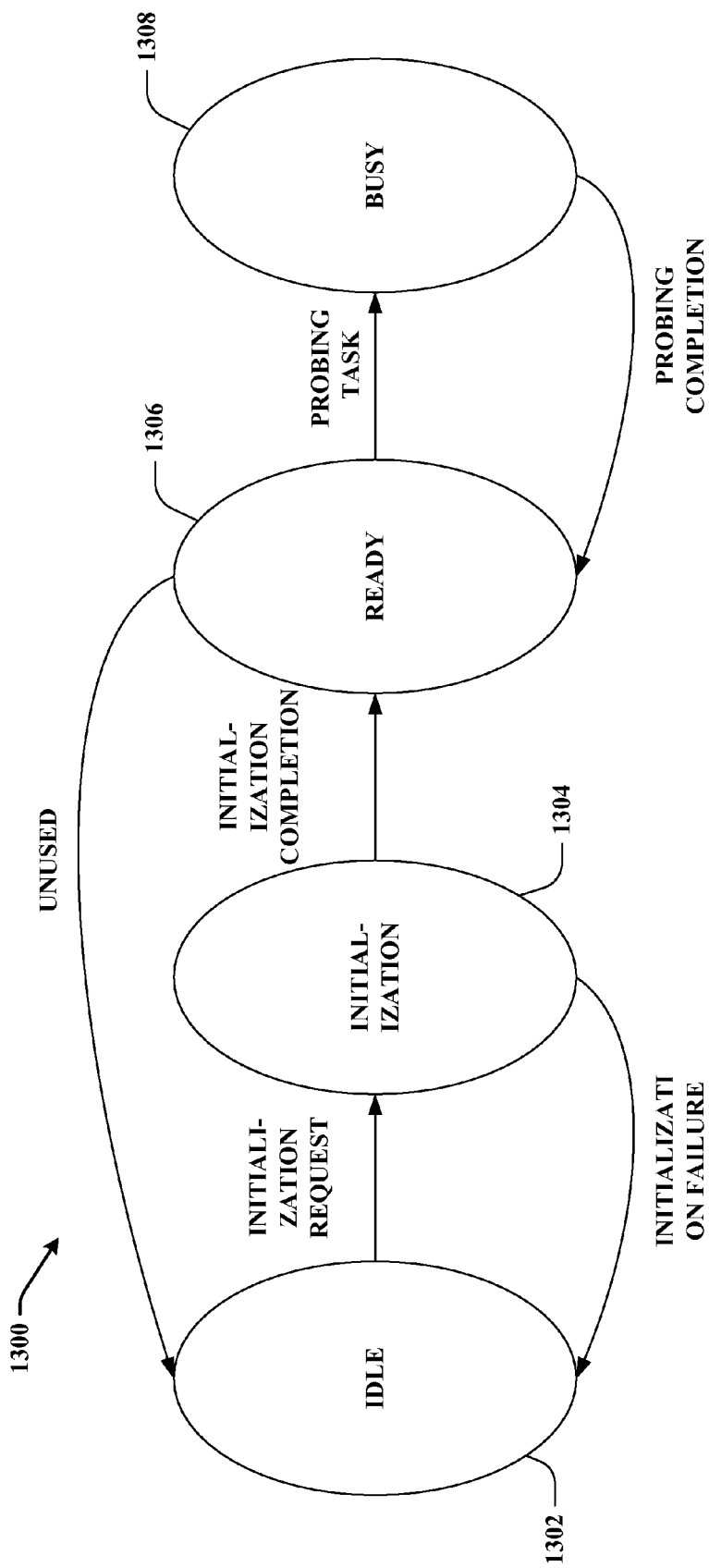
FIG. 13 provides a state transition diagram that can be utilized by devices and/or components of the subject matter as claimed to reveal detailed differences in the performance of Internet Service Provider (ISP) networks in accordance with an aspect of the claimed subject matter.

FIG. 13 illustrates a state transition diagram 1300 that can be employed by probers (e.g., prober 202), for example, in accordance with an aspect of the claimed subject matter. State 1302 can represents an idle state where probers are not being actively utilized for measurements because, for example, they are co-located with an active prober; only one active prober is typically employed per site as others do not necessarily contribute additional paths. State 1304 can represent an initialization state where probers can be located at sites from which fresh routing views have not been received and/or which are in the process of acquiring such a routing view. Initializing and/or acquiring routing views can typically take several hours. State 1306 provides a ready state where probers can be located at sites from which fresh routing views have previously been received but which are currently not probing an Internet Service Provider (ISP). State 1308 provides a state where probers are actively probing an Internet Service Provider (ISP).

The claimed subject matter can be implemented via object oriented programming techniques. For example, each component of the system can be an object in a software routine or a component within an object. Object oriented programming shifts the emphasis of software development away from function decomposition and towards the recognition of units of software called "objects" which encapsulate both data and functions. Object Oriented Programming (OOP) objects are software entities comprising data structures and operations on data. Together, these elements enable objects to model virtually any real-world entity in terms of its characteristics, represented by its data elements, and its behavior represented by its data manipulation functions. In this way, objects can model concrete things like people and computers, and they can model abstract concepts like numbers or geometrical concepts.

The benefit of object technology arises out of three basic principles: encapsulation, polymorphism and inheritance. Objects hide or encapsulate the internal structure of their data and the algorithms by which their functions work. Instead of exposing these implementation details, objects present interfaces that represent their abstractions cleanly with no extraneous information. Polymorphism takes encapsulation one-step further—the idea being many shapes, one interface. A software component can make a request of another component without knowing exactly what that component is. The component that receives the request interprets it and figures out according to its variables and data how to execute the request. The third principle is inheritance, which allows developers to reuse pre-existing design and code. This capability allows developers to avoid creating software from scratch. Rather, through inheritance, developers derive subclasses that inherit behaviors that the developer then customizes to meet particular needs.

In particular, an object includes, and is characterized by, a set of data (e.g., attributes) and a set of operations (e.g., methods), that can operate on the data. Generally, an object's data is ideally changed only through the operation of the object's methods. Methods in an object are invoked by passing a message to the object (e.g., message passing). The message specifies a method name and an argument list. When the object receives the message, code associated with the named method is executed with the formal parameters of the method bound to the corresponding values in the argument list. Methods and message passing in OOP are analogous to procedures and procedure calls in procedure-oriented software environments.

However, while procedures operate to modify and return passed parameters, methods operate to modify the internal state of the associated objects (by modifying the data contained therein). The combination of data and methods in objects is called encapsulation. Encapsulation provides for the state of an object to only be changed by well-defined methods associated with the object. When the behavior of an object is confined to such well-defined locations and interfaces, changes (e.g., code modifications) in the object will have minimal impact on the other objects and elements in the system.

Each object is an instance of some class. A class includes a set of data attributes plus a set of allowable operations (e.g., methods) on the data attributes. As mentioned above, OOP supports inheritance—a class (called a subclass) may be derived from another class (called a base class, parent class, etc.), where the subclass inherits the data attributes and methods of the base class. The subclass may specialize the base class by adding code which overrides the data and/or methods of the base class, or which adds new data attributes and methods. Thus, inheritance represents a mechanism by which abstractions are made increasingly concrete as subclasses are created for greater levels of specialization.

As used in this application, the terms "component" and "system" are intended to refer to a computer-related entity, either hardware, a combination of hardware and software, or software in execution. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

Artificial intelligence based systems (e.g., explicitly and/or implicitly trained classifiers) can be employed in connection with performing inference and/or probabilistic determinations and/or statistical-based determinations as in accordance with one or more aspects of the claimed subject matter as described hereinafter. As used herein, the term "inference," "infer" or variations in form thereof refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification schemes and/or systems (e.g., support vector machines, neural networks, expert systems, Bayesian belief networks, fuzzy logic, data fusion engines . . . ) can be employed in connection with performing automatic and/or inferred action in connection with the claimed subject matter.

Furthermore, all or portions of the claimed subject matter may be implemented as a system, method, apparatus, or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Some portions of the detailed description have been presented in terms of algorithms and/or symbolic representations of operations on data bits within a computer memory. These algorithmic descriptions and/or representations are the means employed by those cognizant in the art to most effectively convey the substance of their work to others equally skilled. An algorithm is here, generally, conceived to be a self-consistent sequence of acts leading to a desired result. The acts are those requiring physical manipulations of physical quantities. Typically, though not necessarily, these quantities take the form of electrical and/or magnetic signals capable of being stored, transferred, combined, compared, and/or otherwise manipulated.

It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the foregoing discussion, it is appreciated that throughout the disclosed subject matter, discussions utilizing terms such as processing, computing, calculating, determining, and/or displaying, and the like, refer to the action and processes of computer systems, and/or similar consumer and/or industrial electronic devices and/or machines, that manipulate and/or transform data represented as physical (electrical and/or electronic) quantities within the computer's and/or machine's registers and memories into other data similarly represented as physical quantities within the machine and/or computer system memories or registers or other such information storage, transmission and/or display devices.

Figure 14:
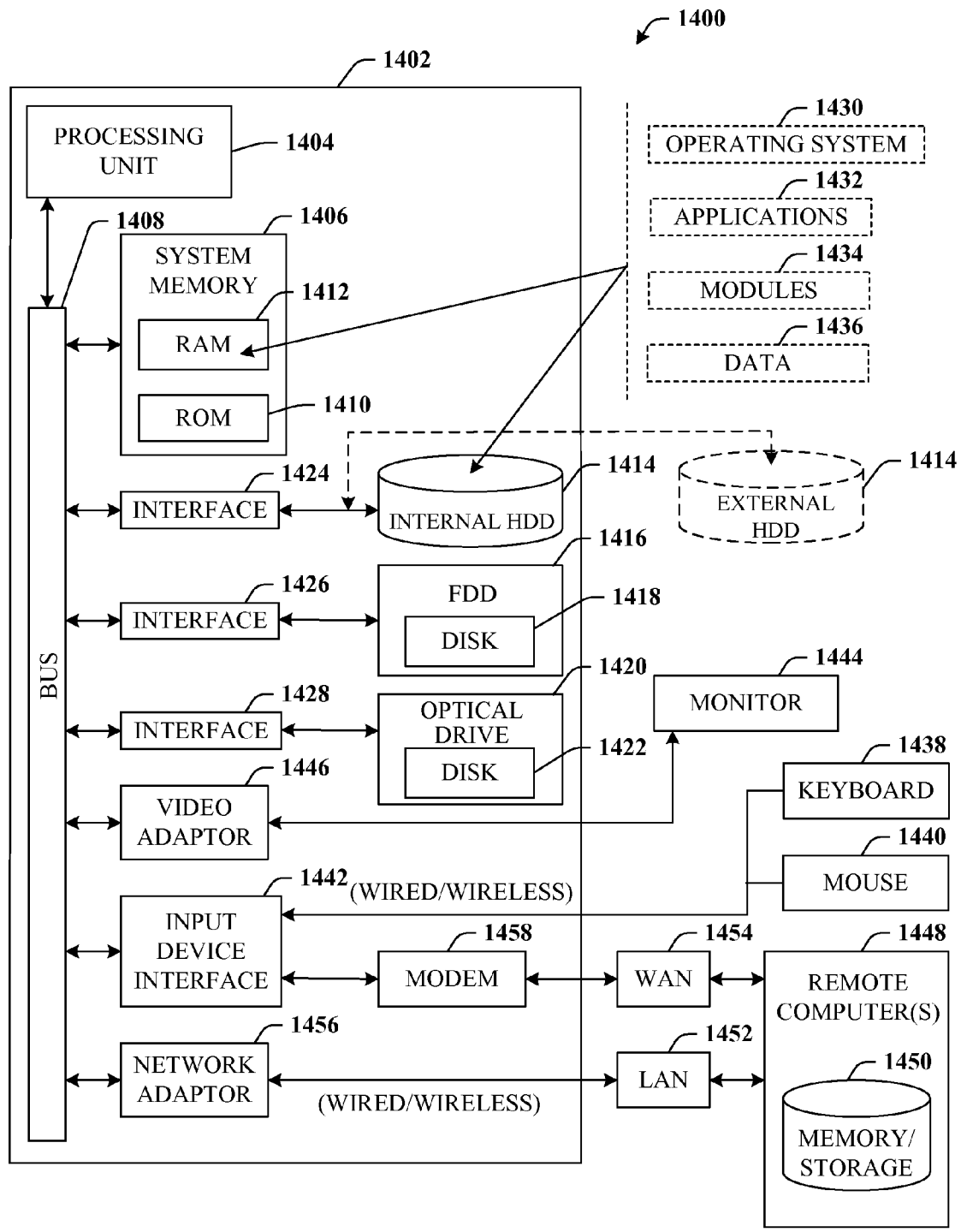
FIG. 14 illustrates a block diagram of a computer operable to execute the disclosed system in accordance with an aspect of the claimed subject matter.

Referring now to FIG. 14, there is illustrated a block diagram of a computer operable to execute the disclosed system. In order to provide additional context for various aspects thereof, FIG. 14 and the following discussion are intended to provide a brief, general description of a suitable computing environment 1400 in which the various aspects of the claimed subject matter can be implemented. While the description above is in the general context of computer-executable instructions that may run on one or more computers, those skilled in the art will recognize that the subject matter as claimed also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the claimed subject matter may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and non-volatile media, removable and non-removable media. By way of example, and not limitation, computer-readable media can comprise computer storage media and communication media. Computer storage media includes both volatile and non-volatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

With reference again to FIG. 14, the exemplary environment 1400 for implementing various aspects includes a computer 1402, the computer 1402 including a processing unit 1404, a system memory 1406 and a system bus 1408. The system bus 1408 couples system components including, but not limited to, the system memory 1406 to the processing unit 1404. The processing unit 1404 can be any of various commercially available processors. Dual microprocessors and other multi-processor architectures may also be employed as the processing unit 1404.

The system bus 1408 can be any of several types of bus structure that may further interconnect to a memory bus (with or without a memory controller), a peripheral bus, and a local bus using any of a variety of commercially available bus architectures. The system memory 1406 includes read-only memory (ROM) 1410 and random access memory (RAM) 1412. A basic input/output system (BIOS) is stored in a non-volatile memory 1410 such as ROM, EPROM, EEPROM, which BIOS contains the basic routines that help to transfer information between elements within the computer 1402, such as during start-up. The RAM 1412 can also include a high-speed RAM such as static RAM for caching data.

The computer 1402 further includes an internal hard disk drive (HDD) 1414 (e.g., EIDE, SATA), which internal hard disk drive 1414 may also be configured for external use in a suitable chassis (not shown), a magnetic floppy disk drive (FDD) 1416, (e.g., to read from or write to a removable diskette 1418) and an optical disk drive 1420, (e.g., reading a CD-ROM disk 1422 or, to read from or write to other high capacity optical media such as the DVD). The hard disk drive 1414, magnetic disk drive 1416 and optical disk drive 1420 can be connected to the system bus 1408 by a hard disk drive interface 1424, a magnetic disk drive interface 1426 and an optical drive interface 1428, respectively. The interface 1424 for external drive implementations includes at least one or both of Universal Serial Bus (USB) and IEEE 1494 interface technologies. Other external drive connection technologies are within contemplation of the claimed subject matter.

The drives and their associated computer-readable media provide nonvolatile storage of data, data structures, computer-executable instructions, and so forth. For the computer 1402, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the disclosed and claimed subject matter.

A number of program modules can be stored in the drives and RAM 1412, including an operating system 1430, one or more application programs 1432, other program modules 1434 and program data 1436. All or portions of the operating system, applications, modules, and/or data can also be cached in the RAM 1412. It is to be appreciated that the claimed subject matter can be implemented with various commercially available operating systems or combinations of operating systems.

A user can enter commands and information into the computer 1402 through one or more wired/wireless input devices, e.g., a keyboard 1438 and a pointing device, such as a mouse 1440. Other input devices (not shown) may include a microphone, an IR remote control, a joystick, a game pad, a stylus pen, touch screen, or the like. These and other input devices are often connected to the processing unit 1404 through an input device interface 1442 that is coupled to the system bus 1408, but can be connected by other interfaces, such as a parallel port, an IEEE 1494 serial port, a game port, a USB port, an IR interface, etc.

A monitor 1444 or other type of display device is also connected to the system bus 1408 via an interface, such as a video adapter 1446. In addition to the monitor 1444, a computer typically includes other peripheral output devices (not shown), such as speakers, printers, etc.

The computer 1402 may operate in a networked environment using logical connections via wired and/or wireless communications to one or more remote computers, such as a remote computer(s) 1448. The remote computer(s) 1448 can be a workstation, a server computer, a router, a personal computer, portable computer, microprocessor-based entertainment appliance, a peer device or other common network node, and typically includes many or all of the elements described relative to the computer 1402, although, for purposes of brevity, only a memory/storage device 1450 is illustrated. The logical connections depicted include wired/wireless connectivity to a local area network (LAN) 1452 and/or larger networks, e.g., a wide area network (WAN) 1454. Such LAN and WAN networking environments are commonplace in offices and companies, and facilitate enterprise-wide computer networks, such as intranets, all of which may connect to a global communications network, e.g., the Internet.

When used in a LAN networking environment, the computer 1402 is connected to the local network 1452 through a wired and/or wireless communication network interface or adapter 1456. The adaptor 1456 may facilitate wired or wireless communication to the LAN 1452, which may also include a wireless access point disposed thereon for communicating with the wireless adaptor 1456.

When used in a WAN networking environment, the computer 1402 can include a modem 1458, or is connected to a communications server on the WAN 1454, or has other means for establishing communications over the WAN 1454, such as by way of the Internet. The modem 1458, which can be internal or external and a wired or wireless device, is connected to the system bus 1408 via the serial port interface 1442. In a networked environment, program modules depicted relative to the computer 1402, or portions thereof, can be stored in the remote memory/storage device 1450. It will be appreciated that the network connections shown are exemplary and other means of establishing a communications link between the computers can be used.

The computer 1402 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11x (a, b, g, etc.) to provide secure, reliable, fast wireless connectivity. A Wi-Fi network can be used to connect computers to each other, to the Internet, and to wired networks (which use IEEE 802.3 or Ethernet).

Wi-Fi networks can operate in the unlicensed 2.4 and 5 GHz radio bands. IEEE 802.11 applies to generally to wireless LANs and provides 1 or 2 Mbps transmission in the 2.4 GHz band using either frequency hopping spread spectrum (FHSS) or direct sequence spread spectrum (DSSS). IEEE 802.11a is an extension to IEEE 802.11 that applies to wireless LANs and provides up to 54 Mbps in the 5 GHz band. IEEE 802.11a uses an orthogonal frequency division multiplexing (OFDM) encoding scheme rather than FHSS or DSSS. IEEE 802.11b (also referred to as 802.11 High Rate DSSS or Wi-Fi) is an extension to 802.11 that applies to wireless LANs and provides 11 Mbps transmission (with a fallback to 5.5, 2 and 1 Mbps) in the 2.4 GHz band. IEEE 802.11g applies to wireless LANs and provides 20+ Mbps in the 2.4 GHz band. Products can contain more than one band (e.g., dual band), so the networks can provide real-world performance similar to the basic 10BaseT wired Ethernet networks used in many offices.

Figure 15:
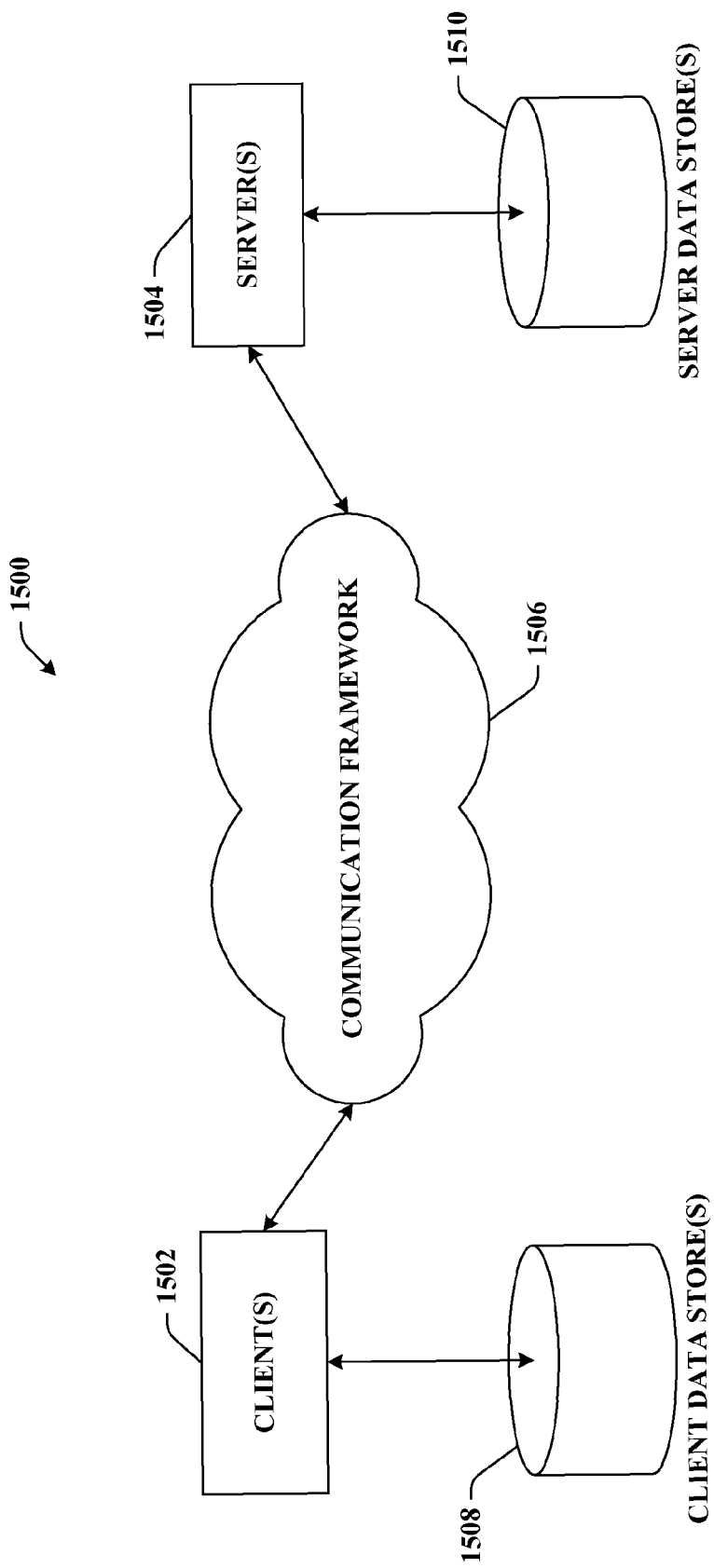
FIG. 15 illustrates a schematic block diagram of an exemplary computing environment for processing the disclosed architecture in accordance with another aspect.

Referring now to FIG. 15, there is illustrated a schematic block diagram of an exemplary computing environment 1500 for processing the disclosed architecture in accordance with another aspect. The system 1500 includes one or more client(s) 1502. The client(s) 1502 can be hardware and/or software (e.g., threads, processes, computing devices). The client(s) 1502 can house cookie(s) and/or associated contextual information by employing the claimed subject matter, for example.

The system 1500 also includes one or more server(s) 1504. The server(s) 1504 can also be hardware and/or software (e.g., threads, processes, computing devices). The servers 1504 can house threads to perform transformations by employing the claimed subject matter, for example. One possible communication between a client 1502 and a server 1504 can be in the form of a data packet adapted to be transmitted between two or more computer processes. The data packet may include a cookie and/or associated contextual information, for example. The system 1500 includes a communication framework 1506 (e.g., a global communication network such as the Internet) that can be employed to facilitate communications between the client(s) 1502 and the server(s) 1504.

Communications can be facilitated via a wired (including optical fiber) and/or wireless technology. The client(s) 1502 are operatively connected to one or more client data store(s) 1508 that can be employed to store information local to the client(s) 1502 (e.g., cookie(s) and/or associated contextual information). Similarly, the server(s) 1504 are operatively connected to one or more server data store(s) 1510 that can be employed to store information local to the servers 1504.

What has been described above includes examples of the disclosed and claimed subject matter. It is, of course, not possible to describe every conceivable combination of components and/or methodologies, but one of ordinary skill in the art may recognize that many further combinations and permutations are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system implemented on a set of machines that uncovers differences in performance of Internet Service Provider (ISP) networks, the system comprising:

at least one memory;
at least one processor;
a controller, stored in the at least one memory and executed by the at least one processor, that utilizes a list of target networks to create a list of destination Internet Protocol (IP) addresses to interrogate, the controller propagates the list of destination addresses to measurement nodes and obtains in return probing results from the measurement nodes, the probing results employed by the controller to provide a comparative performance of the target networks, the controller further discards probing results comprising traceroutes for which forward or reverse hop lengths to an IP (Internet Protocol) address of interest differs by more than a predetermined amount.

2. The system of claim 1, the controller employs Border Gateway Protocol atoms to reduce sustained bandwidth usage.

3. The system of claim 2, atoms include groups of IP (Internet Protocol) prefixes with identical routing policies such that paths to included IP (Internet Protocol) prefixes are identical.

4. The system of claim 1, the controller utilizes a routing view generated by a measurement node to restrict probing to Internet Service Provider (ISP) networks of interest.

5. The system of claim 1, the controller adds probes to a measurement set until all elements are covered at least once.

6. The system of claim 5, elements include paths to the destination Internet Protocol (IP) addresses, paths internal to Internet Service Provider (ISP) networks, or measurement nodes.

7. The system of claim 5, the controller on completion of each processing cycle adds probes that cover a majority of as yet uncovered elements.

8. The system of claim 1, the controller checks for occurrences of errors in DNS (Domain Name Service) names or majority voting through utilization of accumulated traceroute data, the checks for occurrences of errors in DNS names or majority voting comprising:
  checking, for a particular ISP, when a traceroute re-enters a specific geographic region after exiting the specific geographic region; and
  determining when round-trip latency observed between assigned geographic locations of an IP address pair is less than the minimum time it takes for light to travel between the assigned geographic locations.

9. The system of claim 1, the controller employs single-ended measurements to infer path latency.

10. The system of claim 1, the forward hop length determined from a traceroute measurement.

11. The system of claim 1, the reverse hop length inferred using a remaining Time To Live (TTL) value associated with a probe response.

12. The system of claim 1, the controller detects overload events by determining a variance in a round trip time from a measurement node to an IP (Internet Protocol) address where a probe enters the target network.

13. The system of claim 1, further includes a data analyzer, stored in the at least one memory and executed by the at least one processor, that extracts information associated with subpaths of interest from raw measurements returned by the measurement nodes.

14. The system of claim 13, the data analyzer utilizes the extracted information associated with the subpaths to provide latency samples of the subpaths.

15. The system of claim 14, the data analyzer groups the latency samples of the subpaths by source of where a measurement is taken.

16. The system of claim 14, the data analyzer discards latency samples based on a determination of asymmetrical paths, or aggregates latency samples into an estimated duration for subpaths of interest.

17. A method implemented on a set of machines that reveals differences in performance of target Internet Service Provider (ISP) networks, comprising:
  developing a list of Internet Protocol (IP) addresses to interrogate and IP addresses that have been affirmatively requested to never be interrogated; and
  distributing the list of addresses to measurement nodes and retrieving measurement results from the measurement nodes, the measurement results employed to provide a comparative performance of the target Internet Service Provider (ISP) networks, the measurement results comprising:
    routing views and/or raw measurement data; and
    data associated with client applications and/or entities involved with a particular transaction or a portion of a transaction.

18. The method of claim 17, the comparative performance employed by applications to distribute processes or sub-processes for execution on destinations associated with networks with high comparative performance.

19. A computer-readable storage media having executable instructions stored thereon that, when executed by at least one processor, perform operations that provide differences in performance of Internet Service Provider (ISP) networks, the operations comprising:
  producing a list of destination Internet Protocol (IP) addresses to interrogate and destination addresses that have been affirmatively requested to never be interrogated;
  distributing the list of destination addresses for interrogation and destination addresses that have been affirmatively requested to never be interrogated to probers located on a network having the ISP networks;
  determining probers that have stale probing software;
  distributing up-to-date probing software to those probers determined to have stale probing software;
  recovering, from the probers, raw probing results associated with the destination addresses from the interrogation;
  recovering, from at least one of the probers, data associated with client applications and/or entities involved with a particular transaction or a portion of a transaction; and
  converting the raw probing results to provide a comparative performance of the target Internet Service Provider (ISP) networks.

* * * * *